(12) United States Patent
Hosotsubo

(10) Patent No.: US 9,122,659 B2
(45) Date of Patent: Sep. 1, 2015

(54) LAYOUT PROCESSING METHOD FOR DOCUMENT EDITING BY REDUCING BLANK AREAS IN A DOCUMENT

(75) Inventor: Toshihiko Hosotsubo, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 1467 days.

(21) Appl. No.: 12/574,113

(22) Filed: Oct. 6, 2009

(65) Prior Publication Data

US 2010/0088592 A1  Apr. 8, 2010

(30) Foreign Application Priority Data

Oct. 8, 2008  (JP) .................................. 2008-262237

(51) Int. Cl.
G06F 17/00 (2006.01)
G06F 17/21 (2006.01)

(52) U.S. Cl.
CPC .................................. *G06F 17/217* (2013.01)

(58) Field of Classification Search
CPC .................................................... G06F 17/217
See application file for complete search history.

(56) References Cited

U.S. PATENT DOCUMENTS

| 7,212,309 | B1* | 5/2007 | Sellers et | 358/1.2 |
| 2002/0135800 | A1* | 9/2002 | Dutta | 358/1.15 |
| 2004/0017577 | A1* | 1/2004 | Ostrover et al. | |
| 2007/0273895 | A1* | 11/2007 | Cudd et al. | 358/1.1 |

FOREIGN PATENT DOCUMENTS

| JP | 05-266013 A | 10/1993 |
| JP | 2005-149218 A | 6/2005 |
| JP | 2006-171979 A | 6/2006 |

* cited by examiner

*Primary Examiner* — Scott Baderman
*Assistant Examiner* — Asher Kells
(74) *Attorney, Agent, or Firm* — Canon U.S.A., Inc. IP Division

(57) ABSTRACT

A document editing apparatus capable of reducing the total number of pages of a document includes an area generation unit configured to generate a blank area including margins of a document as its objects, an area editing prohibition unit configured to prohibit deletion of blank areas designated by a user from among a plurality of blank areas of the document, and an area reduction unit configured to reduce the blank area whose deletion is prohibited by the area editing prohibition unit in a direction of columns of the document. The document editing apparatus reduces the total number of pages of a document by prohibiting the deletion of an arbitrarily designated blank area and arranging objects located in rear portions of the document in the margin generated by reducing the blank area in the direction of the columns of the document by using the area reduction unit.

9 Claims, 29 Drawing Sheets

LAYOUT PROCESSING METHOD FOR DOCUMENT EDITING BY REDUCING BLANK AREAS IN A DOCUMENT

BACKGROUND OF THE INVENTION

1. Field of the Invention

The present invention relates to a document editing apparatus. More specifically, the present invention relates to a document editing apparatus and a document editing method capable of reducing the total number of pages of a document by deleting or reducing blank areas of the document.

2. Description of the Related Art

Generally, in generating a document, a margin is provided between text areas to increase the readability of the document and improve the appearance thereof. However, when a margin is provided, the total number of pages of a document may increase. Accordingly, the number of pages to be printed may increase in this case.

In order to solve this problem, a conventional printing apparatus, for example, discussed in Japanese Patent Application Laid-Open No. 2005-149218 reduces the total number of pages to be printed by dividing print data of a page previous to a last page into areas each corresponding to the type of the print data (a text string area, an image area, and the like) and reducing the blank portion between the divided areas towards the top edge of the page.

However, a margin in a document is not always unnecessary. More specifically, a margin in a document is significant in increasing the readability and improving the appearance of the document. Accordingly, if all margins of a document are deleted, the readability of the document may considerably degrade.

SUMMARY OF THE INVENTION

The present invention is directed to a document editing apparatus configured to reduce the total number of pages of a document without deleting a margin of the document necessary for increasing and improving the readability and appearance thereof.

According to an aspect of the present invention, a document editing apparatus includes a prohibition unit configured to prohibit editing of a blank area designated by a user from among a plurality of blank areas included in a document, wherein editing which includes reducing of the blank area is prohibited, a reduction unit configured to reduce the blank area whose editing has not been prohibited by the prohibition unit, and a display unit configured to display the document whose blank area not designated by the user has been reduced by the reduction unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe the principles of the invention.

DESCRIPTION OF THE EMBODIMENTS

Various exemplary embodiments, features, and aspects of the invention will be described in detail below with reference to the drawings.

Figure 1:
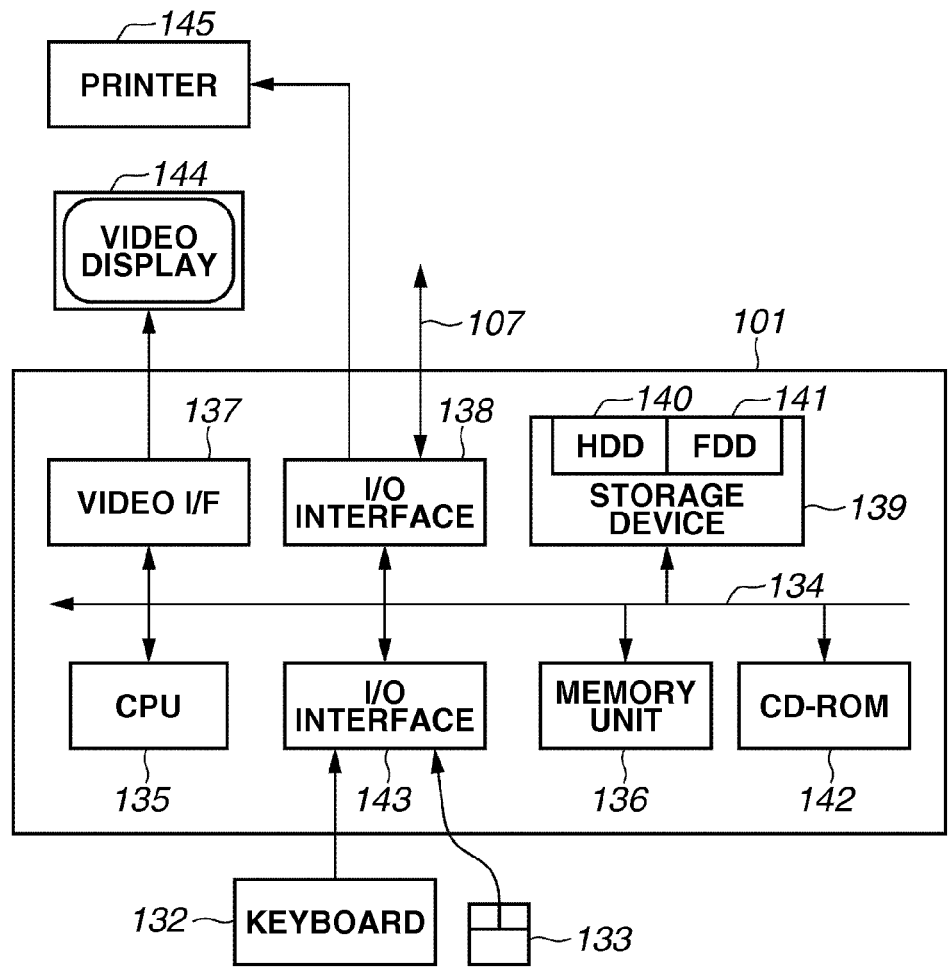
FIG. 1 is a block diagram illustrating an exemplary configuration of a computer used as a document editing apparatus according to an exemplary embodiment of the present invention.

FIG. 1 illustrates an example of a computer module 101, an input device, and an output device used as a document editing apparatus according to an exemplary embodiment of the present invention.

Referring to FIG. 1, the computer module 101 typically includes at least one central processing unit (CPU) 135, a memory unit 136, which includes a semiconductor random access memory (RAM) and a read-only memory (ROM), and an interconnection bus 134.

In addition, the computer module 101 includes input/output (I/O) interface 143. The I/O interface (I/F) 143 includes a video I/F 137.

Input devices, such as a keyboard 132 and a mouse 133, are connected to the I/O interface 143. A video display (output device) 144 is connected to the video I/F 137.

An I/O interface 138 can be connected to another computer apparatus via the network 107. The network 107 typically includes a local area network (LAN) and a wide area network (WAN). In addition, the computer module 101 includes a HDD 140 and a flexible disk drive (FDD) 141 as a storage device 139. However, a magnetic tape drive can be provided to store data.

For a data reading device, the computer module 101 includes a compact disc-read only memory (CD-ROM) 142 as a nonvolatile data source. However, a storage medium other than this, such as a digital versatile disk (DVD), can also be used. A local printer 145 is connected where necessary. An operating system (OS), such as Linux or Windows® of Microsoft Corporation, is installed on the computer module 101. A document editing program is installed on the HDD 140.

Figure 3:
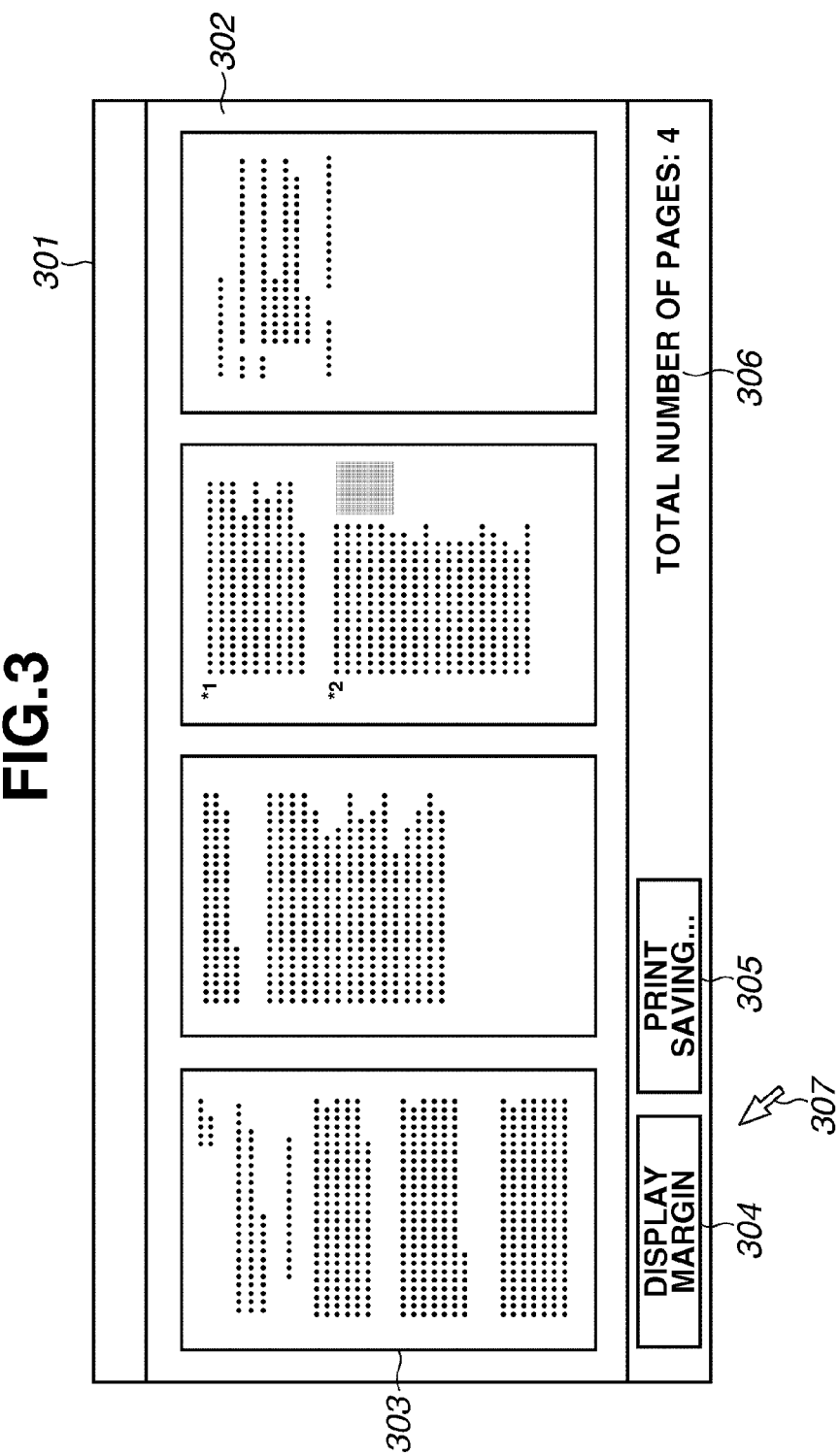
FIG. 3 illustrates an example of a user interface of the document editing program.
Figure 29:
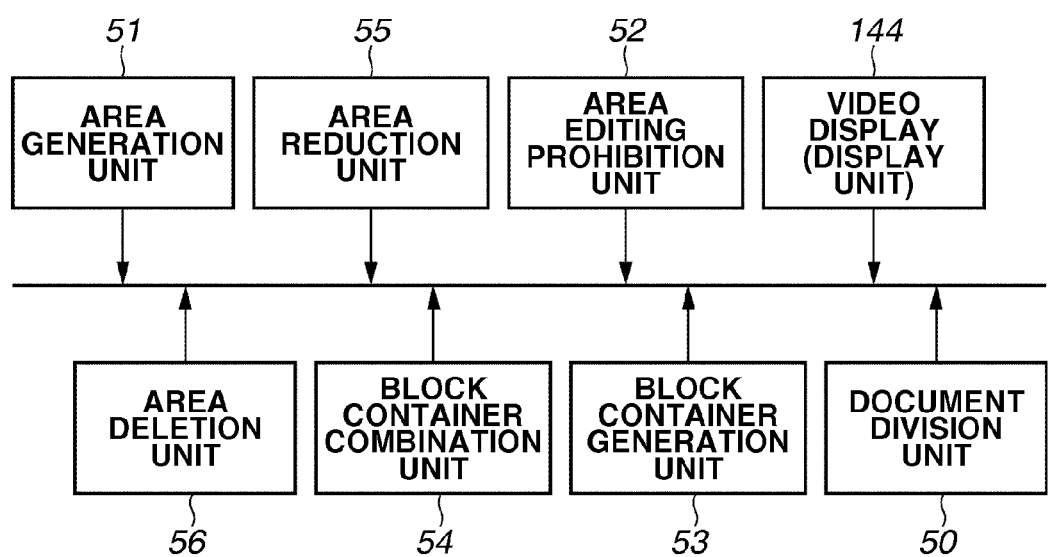
FIG. 29 illustrates an exemplary configuration of the document processing apparatus related to the document editing program.

FIG. 3 illustrates an example of a user interface 301, which is displayed on the video display 144. FIG. 29 is a functional block diagram illustrating primary components related to a program that causes hardware resources, such as the computer module 101 (see FIG. 1) and the input device and the output device connected to the computer module 101, to function as a document editing apparatus.

Referring to FIG. 3, the user interface 301 includes a document display area 302, in which a document to be edited is displayed. In the example illustrated in FIG. 3, a document 303, which has not been edited yet, is displayed in the document display area 302. A "display margin" button 304 can be operated to issue an instruction for displaying a blank container existing in the document 303. A "print saving" button 305 can be operated to issue an instruction for executing processing for reducing the total number of pages of a document (hereinafter simply referred to as "print saving processing"). In the present exemplary embodiment, a "blank container" refers to a container including a margin of a document as its object. More specifically, the blank container is a blank area provided to leave the margin in the document.

Moreover, a total number of pages display area 306 displays the current total number of pages. A user can move a mouse pointer 307 over the user interface 301 by operating the mouse 133.

Referring to FIG. 29, a document generation program causes the CPU 135 to function as a document division unit 50, a area generation unit 51, a area editing prohibition unit 52, a block container generation unit 53, a block container combination unit 54, an area reduction unit 55, and an area deletion unit 56. On the other hand, the document generation program causes the video display 144 to function as a display unit and a user interface.

When the document generation program is activated, the CPU 135 functions as a screen display unit and displays a document designation screen on the video display 144.

When the user designates a document via the document designation screen by operating the mouse 133 or the keyboard 132, the CPU 135 calls the designated document from the HDD 140 and displays the document on the user interface. The display format can be arbitrarily determined. In the present exemplary embodiment, the CPU 135 executes control for displaying a plurality of pages of the document side by side in order of page number. In this state, the CPU 135 waits for a user operation and detects if any is input.

If it is determined that the user has pressed the "display margin" button 304, then the CPU 135 functions as the document division unit 50. More specifically, the CPU 135 analyzes the structure of the designated document. In addition, the CPU 135 divides the document into an object and a margin. Furthermore, the CPU 135 displays the object and the margin in each page of the document.

After that, the CPU 135 functions as the area generation unit 51. The area generation unit 51 generates a blank container for each margin of the document at the location of the margin. In addition, the area generation unit 51 stores the margin of the document in the generated blank container. Then, the CPU 135 functions as the area editing prohibition unit 52.

When the user moves the mouse pointer over a blank container not to be edited, of the blank containers displayed on the video display 144, and right-clicks the mouse 133 to issue an instruction, the area editing prohibition unit 52 finally sets and records the designated margin container as a non-editing blank container. In addition, the area editing prohibition unit 52 prohibits the deletion of the blank container by the area deletion unit 56 or the editing thereof by the area reduction unit 55.

Furthermore, the CPU 135 functions as the block container generation unit 53. The block container generation unit 53 generates a front block container in a portion previous to the blank container (in an upper portion towards the top side of the document), whose editing has been prohibited by the area editing prohibition unit 52. In addition, the block container generation unit 53 generates a rear block container in a portion subsequent to the blank container (in a lower portion from the top side of the document), whose editing has been prohibited by the area editing prohibition unit 52. Furthermore, the CPU 135 stores an object located in a portion existing previous to the blank container and the blank container in the front block container. Similarly, the CPU 135 stores an object located in a portion subsequent to the blank container and the blank container in the rear block container.

Then, the CPU 135 changes its function to the block container combination unit 54. The block container combination unit 54 combines the front block container and the rear block container into the blank container, whose editing has been prohibited by the area editing prohibition unit 52. After that, the CPU 135 functions as the area reduction unit 55. The area reduction unit 55 reduces the editing-prohibited blank container in a direction of a column of the document.

The CPU 135 repeats the above-described processing on the blank container designated by the user. In addition, the CPU 135 moves the rear block container towards the document top side while reducing the blank container to reduce the total number of pages of the document. The area reduction unit 55 restricts a reduction value for each blank container to a predetermined value in order to maintain a high readability and appearance of the document.

Now, an exemplary embodiment of the document generation program, a document generation apparatus, and the user interface will be described in detail below.

Figure 2:
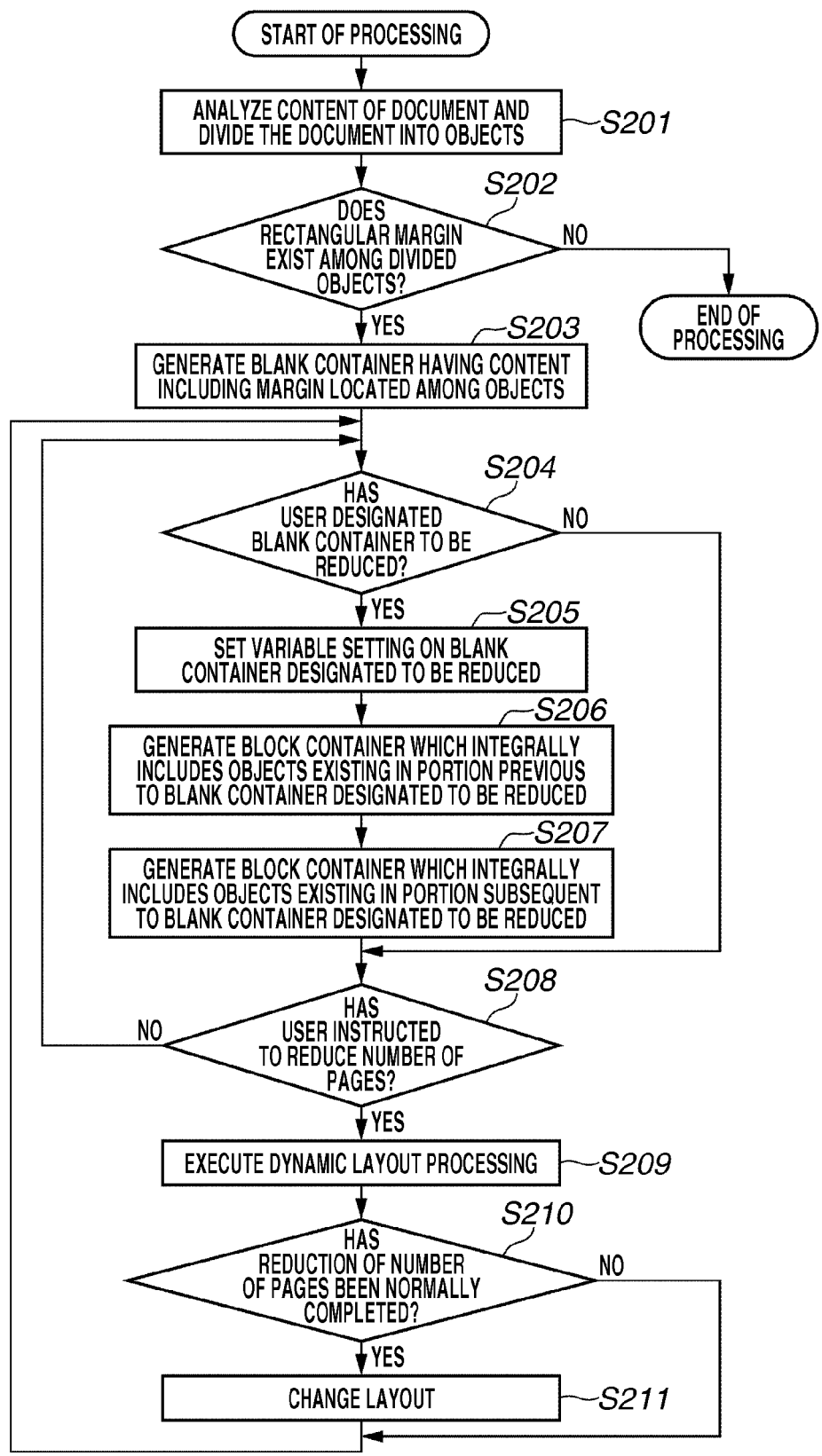
FIG. 2 is a flow chart illustrating exemplary processing executed according to a document editing program.

FIG. 2 is a flow chart illustrating exemplary processing executed by the CPU 135 according to the document editing program. The processing illustrated in FIG. 2 starts when the user presses the "display margin" button 304 on the user interface by operating the mouse 133. Referring to FIG. 2, in step S201, the CPU 135 analyzes a format of the document according to object information, such as the type, the location, or the size of the object included in the document 303. After that, the CPU 135 updates the object, the margin, and the display information displayed in the document display area 302 according to a result of the analysis.

In step S202, the CPU 135 determines whether a rectangular margin having a width equivalent to the width of the document (hereinafter simply referred to as a "margin") exists among the divided objects. If it is determined that a margin exists (YES in step S202), then the processing advances to step S203. On the other hand, if it is determined that no such margin exists (NO in step S202), then the processing ends.

In step S203, the CPU 135, functioning as the area generation unit 51, generates a blank container having content including the margin among the objects of the document 303. Now, processing for generating a blank container will be described in detail below with reference to FIGS. 4 and 5.

Figure 4:
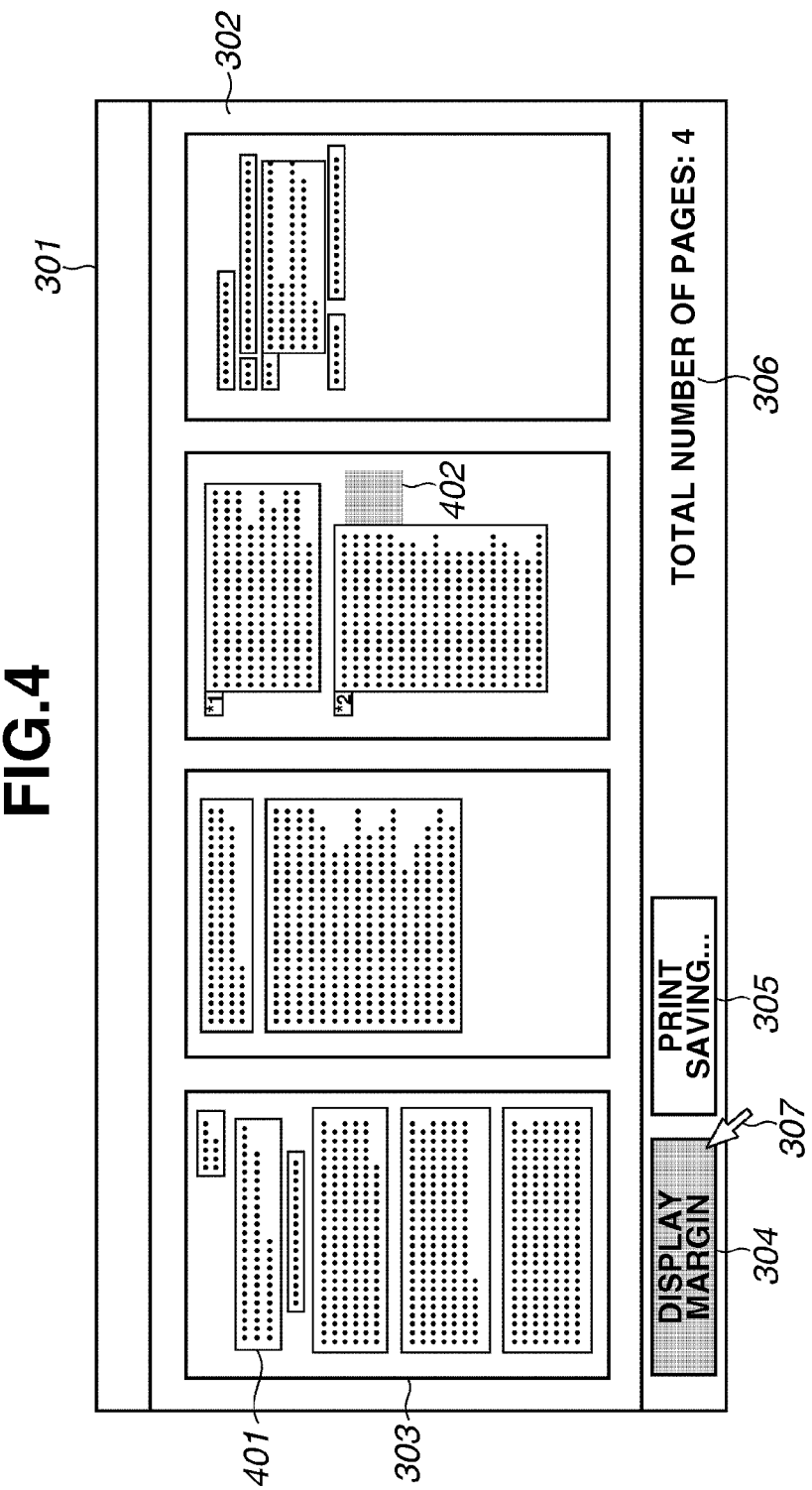
FIG. 4 illustrates an example of a user interface of the document editing program.
Figure 5:
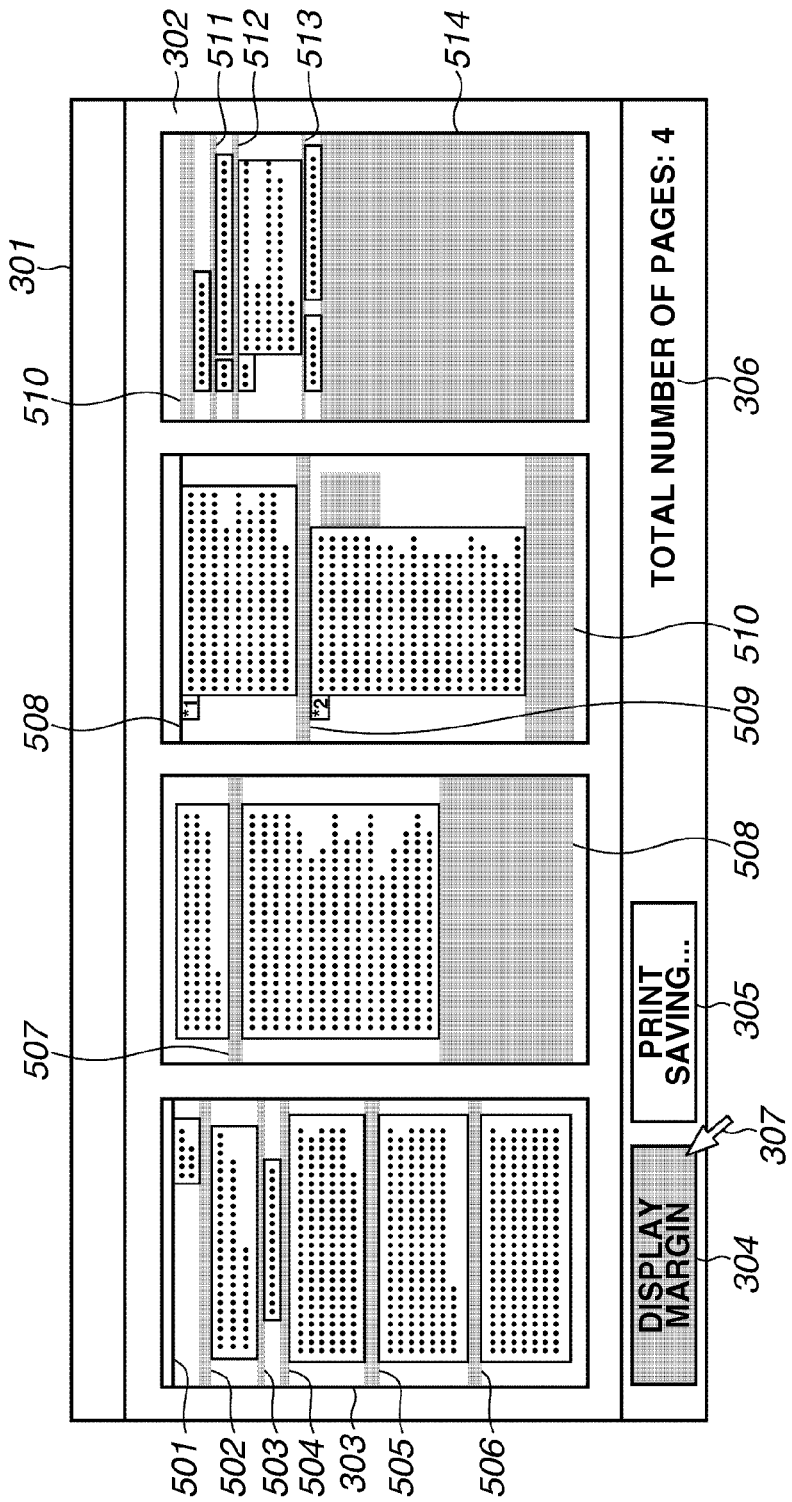
FIG. 5 illustrates an example of a user interface of the document editing program.

Referring to FIG. 4, in a first page of the document, the area generation unit 51 detects a margin whose width is equivalent to the width of the document in a top portion of the first page. Then, the area generation unit 51 recognizes an area from the top portion to a location extending downwards not including an object such as a text area or an image area as a blank container 501. In addition, the area generation unit 51 detects a margin whose width is equivalent to the width of the document, which exists in a bottom portion of a first object. Furthermore, the area generation unit 51 recognizes an area extending from the bottom of the first object to a top edge of a next object 401 as a second blank container 502. By repeating the processing described above, the area generation unit 51 generates blank containers 503 through 506.

Moreover, the area generation unit 51 detects a margin whose width is equivalent to the width of the document, which is located at a bottom portion of a second object of a second page. In addition, the area generation unit 51 generates a margin extending from the bottom of the second object of the second page to a top edge of a first object (immediately subsequent object) of a third page as a blank container 508. In the above-described manner, the area generation unit 51 generates one blank container including a margin extending over a plurality of pages.

In addition, the area generation unit 51 generates a margin extending from a last object of a last page to the bottom of the page as one blank container 514. In the present exemplary embodiment, a blank container is not overlapped with any other objects. Furthermore, in the present exemplary embodiment, "print saving (processing)" refers to processing for reducing the number of prints by composing and rearranging the pages by utilizing the margins. A "page margin" is not included in a blank container. Accordingly, a page margin can be utilized. By executing the processing by the area generation unit 51 described above, the area generation unit 51 generates the blank containers 501 through 514 illustrated in FIG. 5.

<Display of Blank Container>

When the user presses the "display margin" button 304, the CPU 135 displays the blank containers 501 through 514. On the other hand, when the user presses the "display margin" button 304 again in this state, the CPU 135 discontinues the display of the blank containers 501 through 514. When the blank containers are completely generated by the area generation unit 51 in step S203, then the processing advances to step S204.

In step S204, the CPU 135 determines whether the user has designated a blank container to be reduced from among the blank containers 501 through 514. If it is determined that the user has designated a blank container to be reduced (YES in step S204), then the processing advances to step S205. The designation of the blank container to be reduced can be executed by the user via the video display 144 by operating the mouse 133 and the keyboard 132.

In step S205, the CPU 135 sets a variable attribute on the blank container designated by the user. More specifically, in the present exemplary embodiment, the user can open a "property" dialog 701 (FIG. 7) from a pop-up menu 601 (FIG. 6) and set a variable attribute of the blank container via the property dialog 701. The property dialog 701 is linked with the pop-up menu 601 by the block container combination unit 54.

Figure 6:
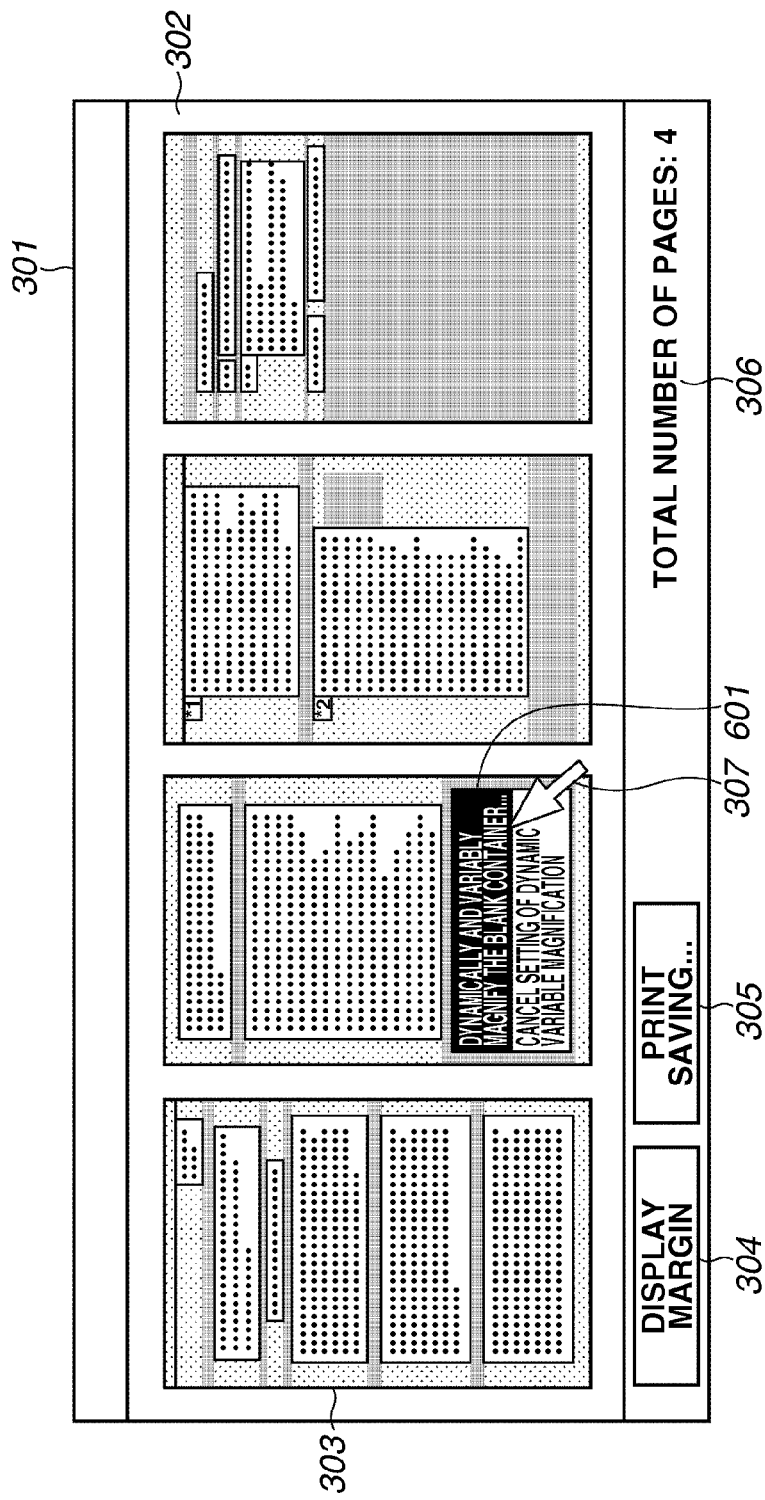
FIG. 6 illustrates an example of a user interface of the document editing program.
Figure 7:
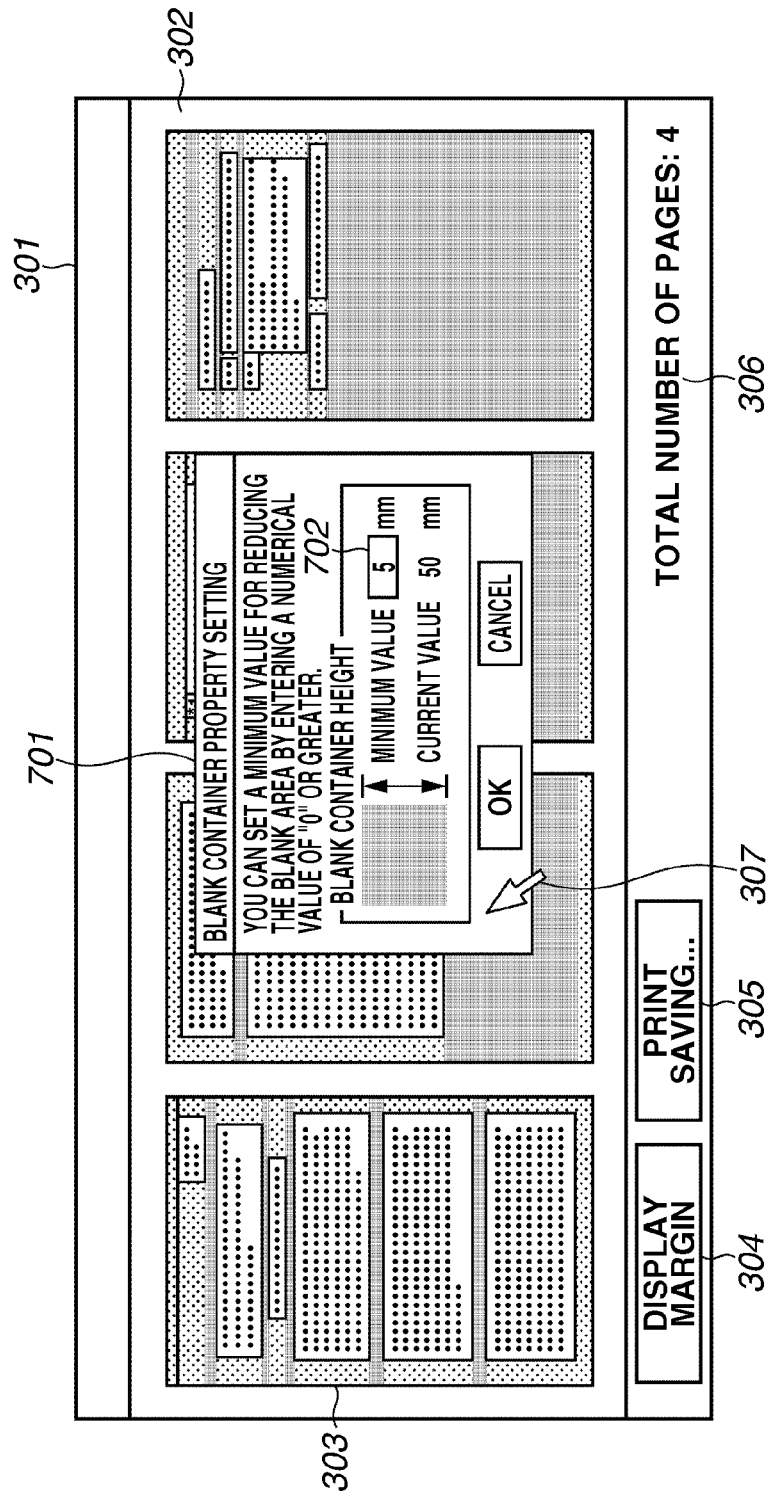
FIG. 7 illustrates an example of a user interface of the document editing program.

FIG. 6 illustrates an example of the pop-up menu 601. FIG. 7 illustrates an example of the property dialog 701, which is linked with the pop-up menu 601 (FIG. 6) by the block container combination unit 54.

If it is detected that the user has right-clicked the mouse 133, then the CPU 135 displays the pop-up menu 601 on the user interface 303. The CPU 135 is linked with a final setting button and a cancel button, i.e., an "OK" button and a cancel button displayed on the property dialog 701 (FIG. 7), which is called from the pop-up menu 601, by the block container combination unit 54.

When the user enters a numerical value in an "edit" box 702 of the property dialog 701 for setting a minimum value of the height of the container and presses the "OK" button, which is the final setting button, then the CPU 135 finally sets the input numerical value as the variable setting value of the container. When the setting of the height of the blank container is completed by pressing the final setting button, the processing advances to step S206.

In step S206, the CPU 135 generates a block container, which integrally includes a text object, an image object, and a blank container that has not been designated as a reduction target blank container, which exist in a portion existing previous to the blank container to be reduced (towards the previous page).

In this case, if another blank container that has been designated by the user as a reduction target blank container exists in a portion in previous (towards the previous page) to the reduction target blank container, then the CPU 135 generates a block container (a front block container) that integrally includes objects existing in a portion existing previous to the blank container.

In step S207, the CPU 135 generates a block container, which integrally includes a text object, an image object, and a blank container that has not been designated as a reduction target blank container, which exist in a portion subsequent to the blank container to be reduced (towards the subsequent page). In this case, if another blank container that has been designated by the user as a reduction target blank container exists in a portion in a subsequent portion (towards the subsequent page) of the reduction target blank container, then the CPU 135 generates a block container (a rear block container) that integrally includes objects existing in a portion subsequent to the blank container.

Figure 8:
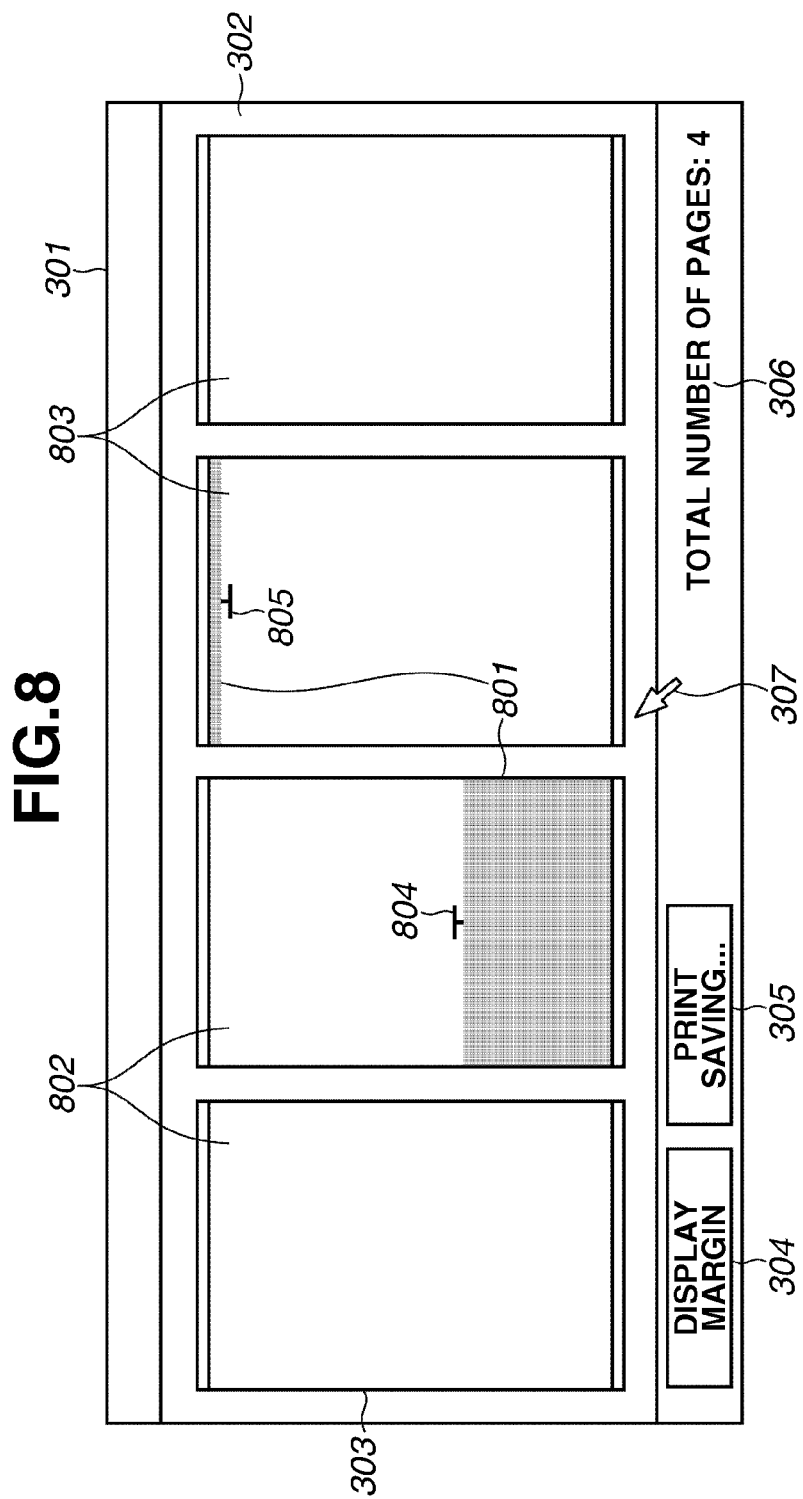
FIG. 8 illustrates an example of a user interface of the document editing program.

FIG. 8 illustrates an example of the block container generated in steps S206 and S207.

Referring to FIG. 8, the document 303 includes a blank container to be reduced (reduction target container) 801, a front block container 802, and a rear block container 803. In addition, links (combining portions) 804 and 805 connect the reduction target container 801 with the front block container 802 and the rear block container 803, respectively.

In step S208 (FIG. 2), the CPU 135 determines whether the user has pressed the "print saving" button 305. More specifically, the CPU 135 determines whether to reduce the number of pages of the document 303 according to a result of the determination of whether the user has pressed the "print saving" button 305. If it is determined that the "print saving" button 305 has been pressed (YES in step S208), then the CPU 135 executes control for reducing the number of pages. On the other hand, if it is determined that the "print saving" button 305 has not been pressed (NO in step S208), then the CPU 135 executes control for not reducing the number of pages.

If it is determined that the "print saving" button 305 has not been pressed (NO in step S208), then the CPU 135 repeats the processing in steps S204 through S207 until the user presses the "print saving" button 305. If it is determined that the "print saving" button 305 has been pressed (YES in step S208), then the processing advances to step S209. In step S209, the CPU 135 reduces the number of pages by executing dynamic layout processing. More specifically, the CPU 135 executes print saving processing on the document 303.

Figure 13:
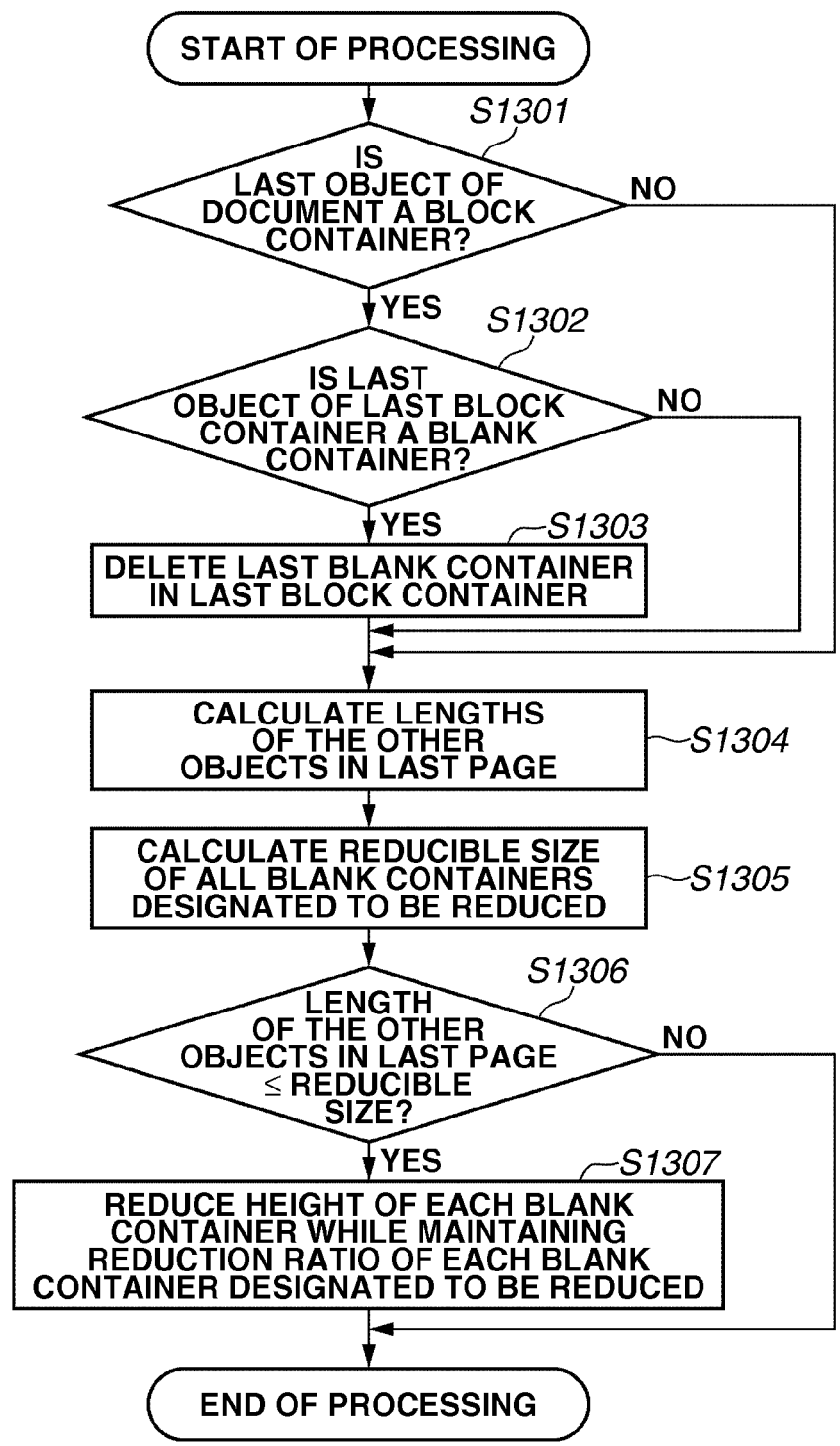
FIG. 13 is a flow chart illustrating exemplary processing executed according to the document editing program.

FIG. 13 is a flow chart illustrating an example of the dynamic layout processing (print saving processing) executed by the CPU 135 according to the present exemplary embodiment.

Referring to FIG. 13, in step S1301, the CPU 135 determines whether a last object in the last page of the document 303 is a block container. The determination as to the type of the object in step S1301 is executed according to a history of generating the blank container in step S202 and a history of generating the block container in steps S206 and S207.

If it is determined that a last object in the last page of the document 303 is a blank container (NO in step S1301), then the processing advances to step S1304. On the other hand, if it is determined that a last object in the last page of the document 303 is a block container (YES in step S1301), then the processing advances to step S1302.

In step S1302, the CPU 135 determines whether a last object in the block container is a blank container. The determination as to the type of the object in step S1302 is executed according to a history of generating the blank container in step S202 and a history of generating the block container in steps S206 and S207.

If it is determined that a last object in the last page of the document 303 is not a blank container (NO in step S1301), then the processing advances to step S1304. On the other hand, if it is determined that a last object in the last page of the document 303 is a block container (YES in step S1301), then the processing advances to step S1302.

In step S1304, the CPU 135 calculates the height of the other objects included in the last page. Then, the processing advances to step S1305.

Figure 12:
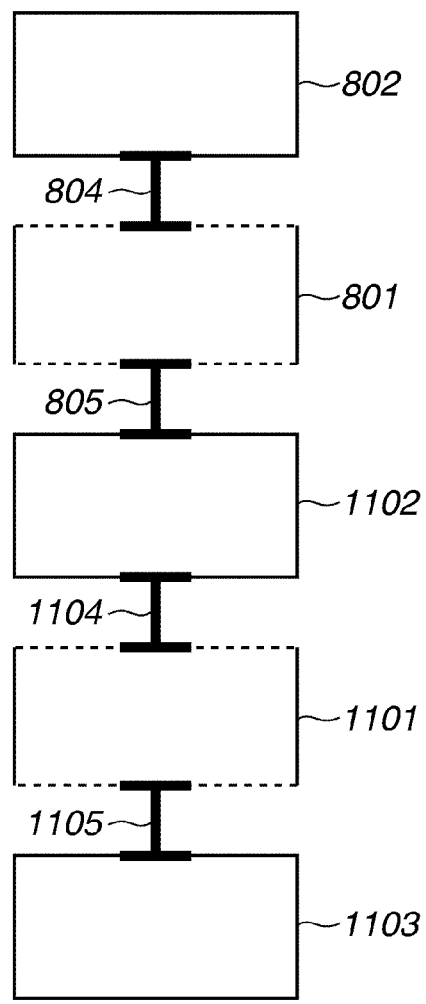
FIG. 12 schematically illustrates an example of an aggregate of containers illustrated in FIG. 11.

In step S1305, the CPU 135 calculates the total size of all the reducible blank containers to be reduced, which exist in the document 303. In the present exemplary embodiment, as illustrated in FIG. 12, the CPU 135 calculates a difference between the height of the reduction target container 801, which has been designated by the user as a reduction target, and the minimum value of the height set for the reduction target container 801.

Similarly, a difference between the height of a reduction target container 1101, which has been designated by the user as a reduction target, and the minimum value of the height set for a reduction target container 1101. The CPU 135 adds the difference values to calculate the reducible size.

In step S1306, the CPU 135 determines whether the value calculated in step S1304 (the length of the other objects included in the last page) is equal to or less than the value calculated in step S1305 (the reducible size).

If it is determined that the length of the other objects included in the last page is equal to or less than the reducible size (YES in step S1306), then the processing advances to step S1307. In step S1307, the CPU 135 reduces the height of each blank container designated as the reduction target by the size equivalent to the length of the objects included in the last page. By calculating the layout in the above-described manner, the blank area reduction unit 55 can reduce the blank container by the necessary size without deleting a blank container.

For the calculation of the layout, the present exemplary embodiment executes the calculation for reducing the height of the blank container so that the height of each blank container does not become smaller than the minimum setting value set for the height of each blank container while maintaining the ratio of the height of each blank container that has been designated to be reduced. More specifically, the present exemplary embodiment executes the following calculation where "A:B" denotes the ratio of the height of the reduction target container 801 to the height of the reduction target container 1101, "X" denotes the minimum value of the height of the reduction target container 801, "Y" denotes the minimum value of the height of the reduction target container 1101, and "Z" denotes the length of the objects included in the last page.

(1) While maintaining the ratio (A:B), the CPU 135 reduces the height of each of the reduction target container 801 and the reduction target container 1101.

(2) In reducing the height while maintaining the ratio (A:B), if the height of the reduction target container 801 is smaller than the minimum value X, then the CPU 135 does not reduce the reduction target container 801 due to the shortage against the height minimum value X and executes the reduction of the height of the reduction target container 1101 only.

(3) In the state described in the above calculation (2), if the height of the reduction target container 1101 is smaller than the minimum value Y, then the CPU 135 does not reduce the reduction target container 1101 due to the shortage against the height minimum value Y and executes the reduction of the reduction target container 801 only.

(4) If the total sum of the reduction values reaches Z, then the CPU 135 ends the processing. In the above-described manner, the present exemplary embodiment executes the flow of the dynamic layout processing.

If it is determined in step S1306 that the length of the objects included in the last page is greater than the total sum of the minimum values of the height of all the reduction target blank containers, then the CPU 135 suspends the layout calculation. Based on the method for calculating the dynamic layout of the containers linked by the link (combination portion), the reduction target blank container and the front and rear block containers existing across the reduction target blank container constitute an aggregate of containers as illustrated in FIG. 8.

Figure 9:
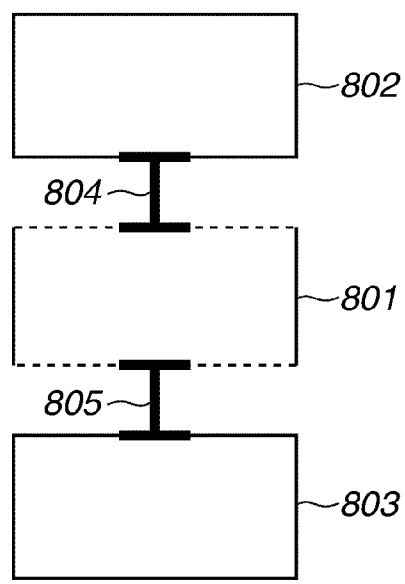
FIG. 9 schematically illustrates an example of an aggregate of containers illustrated in FIG. 8.

FIG. 9 illustrates an example of the aggregate of containers, which constitutes the aggregate of containers formed by the dynamic layout processing described above. In the example illustrated in FIG. 9, the CPU 135 sets the length between the top side and the bottom side of only the reduction target container 801 as variable and changes the size of the reduction target container 801 by executing the above-described dynamic layout calculation. After completing the processing in step S209 (FIG. 2), then the processing advances to step S210.

In step S210, the CPU 135 determines whether the number of pages has been normally reduced. More specifically, the CPU 135 determines whether the number of pages has been normally reduced by changing the page locations of the objects existing in portions subsequent to the blank area whose editing has not been prohibited (of the document 303 whose total number of pages has been reduced).

If it is determined that the number of pages has been normally reduced (YES in step S210), then the processing advances to step S211. On the other hand, if it is determined that the number of pages has not been normally reduced (NO in step S210), then the processing returns to step S204 and repeats the processing in step S204 and subsequent processing to change the height of the blank container and execute the above-described dynamic layout calculation.

In step S211, the CPU 135 finally sets the change of the layout. When the change of the layout is finally set, the processing returns to step S204 and waits for a user designation of a blank container to be reduced is input.

In this case, if the user has newly designated a blank container to be reduced, then the CPU 135 reduces the number of pages of the document 303 by setting the height of the designated reduction target blank container and executing the dynamic layout calculation on the block containers existing across the reduction target blank container.

Figure 14:
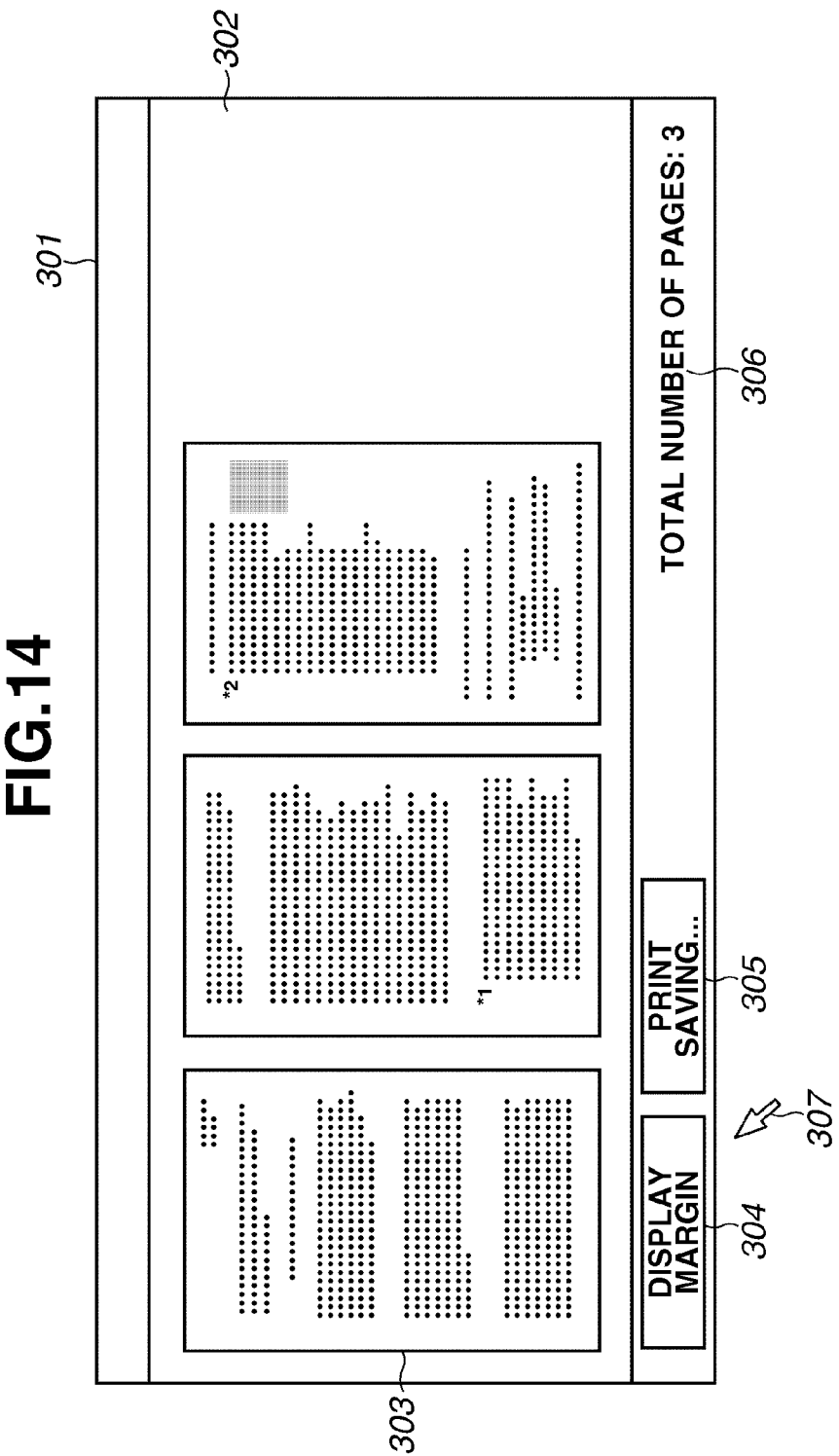
FIG. 14 illustrates an example of a user interface of the document editing program.

FIG. 14 illustrates an example of the user interface 301 when the change of the layout has been finally set.

The CPU 135 updates the display in the total number of pages display area 306 according to the result of the reduction of the total number of pages of the document 303. The document editing program according to the present exemplary embodiment can reduce the total number of pages in the above-described manner.

Figure 10:
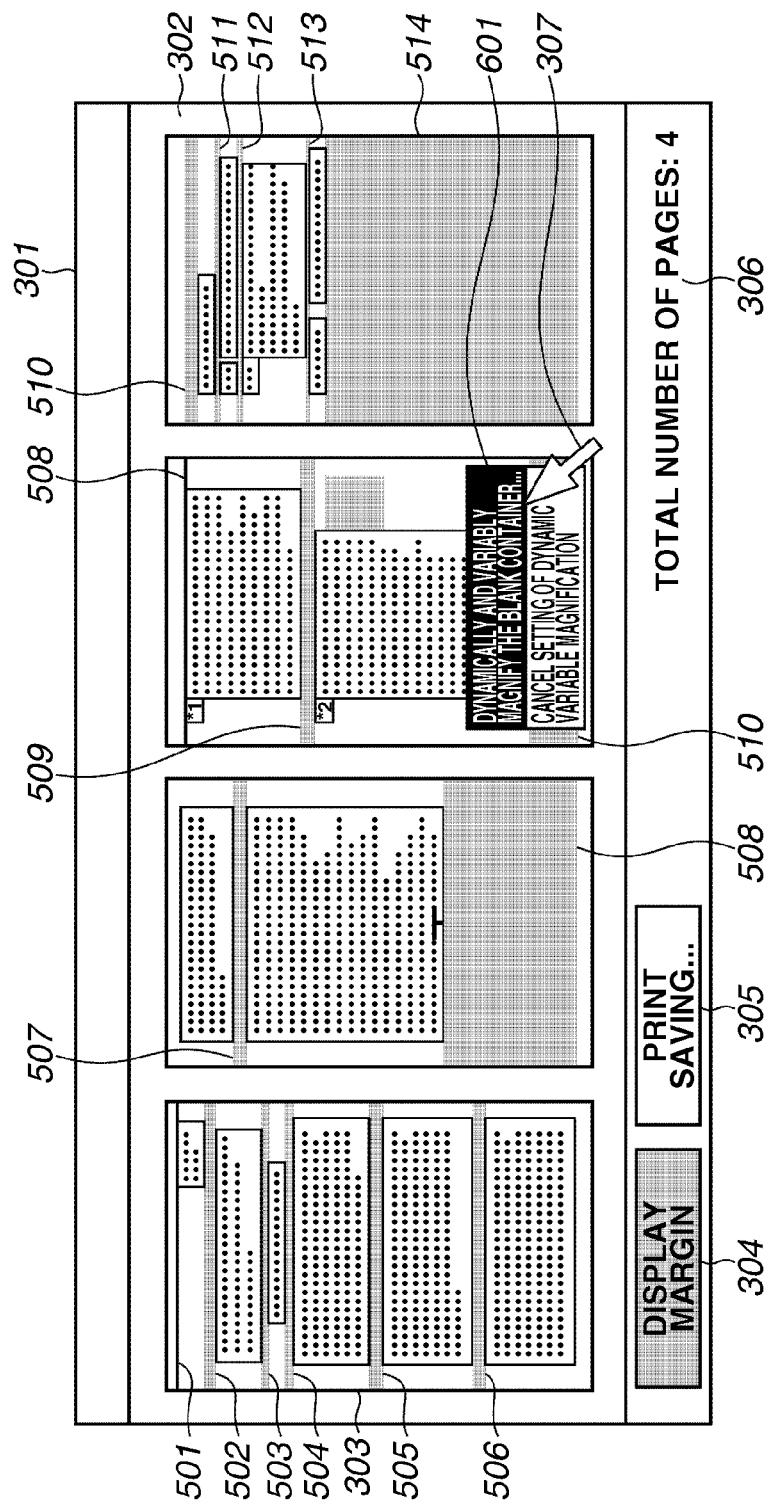
FIG. 10 illustrates an example of a user interface of the document editing program.

FIG. 10 illustrates an example of the user interface 301 to be displayed if the user has further designated a blank container included in a block container as a reduction target blank container according to the present exemplary embodiment.

In this case, the user issues an instruction for displaying the pop-up menu 601 illustrated in FIG. 6 and presses the "display margin" button 304 again by operating the mouse 133. The CPU 135 displays the blank containers 501 through 514, which are included in the block container, in a reversed display state so that the user can easily distinguish between the blank containers 501 through 514 and the other objects and recognize that the user can designate a blank container from among the blank containers 501 through 514 again.

Figure 11:
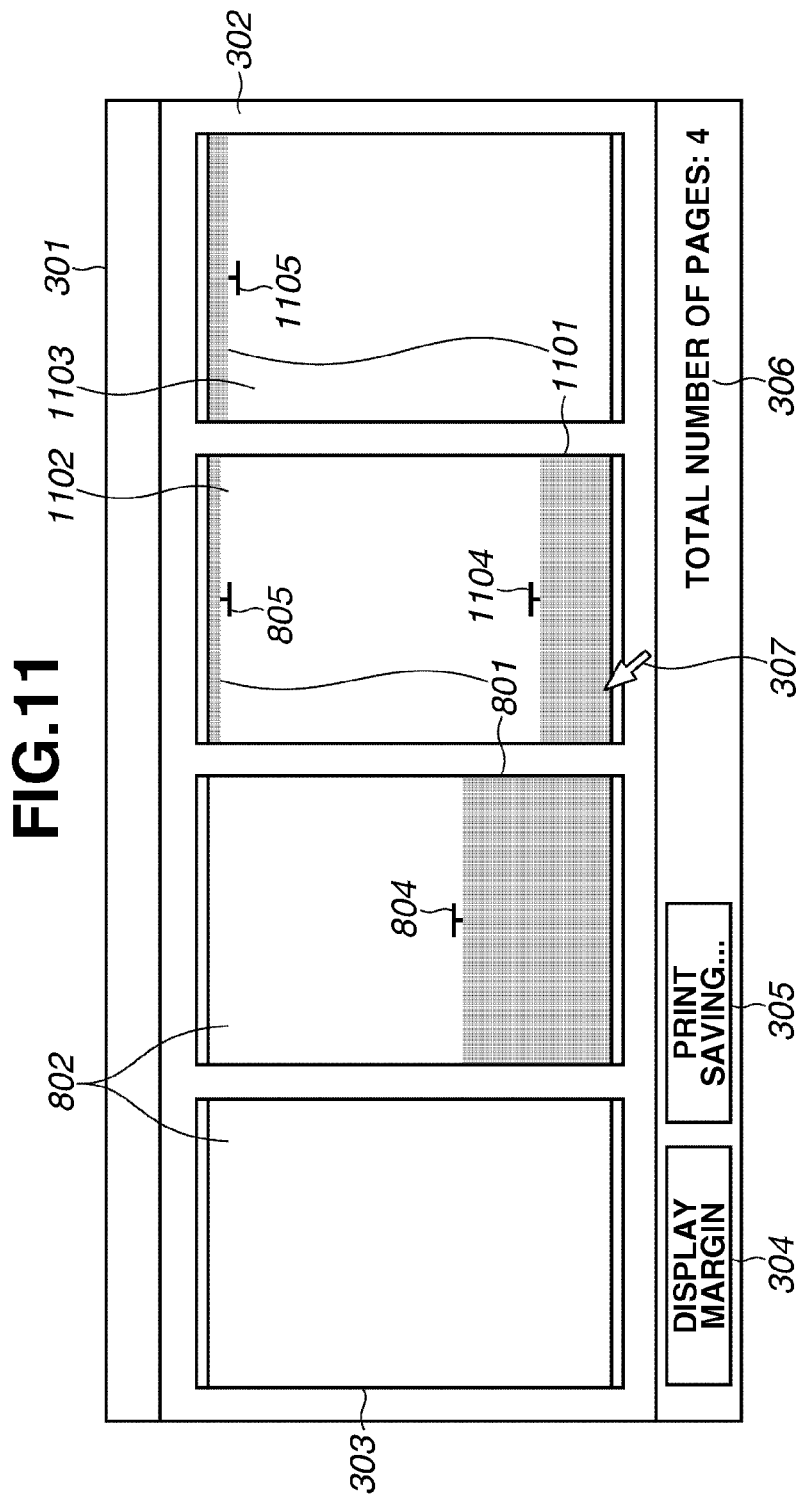
FIG. 11 illustrates an example of a user interface of the document editing program.

FIG. 11 illustrates an example of the user interface 301 to be displayed if the user has further designated another blank container included in the block container as the reduction target blank container and generated a block container. FIG. 12 schematically illustrates an example of an aggregate of containers illustrated in FIG. 11.

In the example illustrated in FIG. 11, the CPU 135 divides the block container 803 illustrated in FIG. 10 to generate a newly-designated reduction target blank container 1101, which exists in a portion existing previous to the blank container 1101, a block container 1102, which exists in a portion subsequent to the blank container 1101, and a block container 1103, which exists in a portion subsequent to the reduction target container 1101.

In addition, the CPU 135 generates links (combining portions) 1104 and 1105, which are links to the containers 1101 through 1103. In the example illustrated in FIG. 12, the top side and the bottom side of each of the reduction target container 801 and the reduction target container 1101 are variable. Accordingly, the CPU 135 changes the size of the reduction target container 801 and the reduction target container 1101 by executing the dynamic layout calculation.

For the method of calculating the dynamic layout of the container, the dynamic layout calculation method discussed in Japanese Patent Application Laid-Open No. 2005-122728 and Japanese Patent Application Laid-Open No. 2005-135397, which the applicant of the present invention has discussed earlier, can be used. By using the method of calculating the dynamic layout of a container linked with a link (combination portion) discussed in Japanese Patent Application Laid-Open No. 2005-122728 and Japanese Patent Application Laid-Open No. 2005-135397, the reduction target blank container and the front and rear block containers existing across the reduction target blank container constitute an aggregate of containers.

Moreover, if the CPU 135 has suspended the calculation of the layout in step S1306, then the CPU 135 determines that the total number of pages of the document 303 has not been successfully reduced. In this case, the CPU 135 does not change the layout and returns the display of the user interface 301 to the display illustrated in FIG. 5.

With the above-described configuration, the document editing apparatus according to the present exemplary embodiment can automatically generate a blank container having content including margins of a document. In addition, if the user has designated the reduction of one of the margins, then the present exemplary embodiment changes the blank container into a variable container. According to the present exemplary embodiment having the configuration described above, the margin that the user intends to leave as it is can be left without being deleted while reducing the total number of pages by reducing the variable container.

Figure 15:
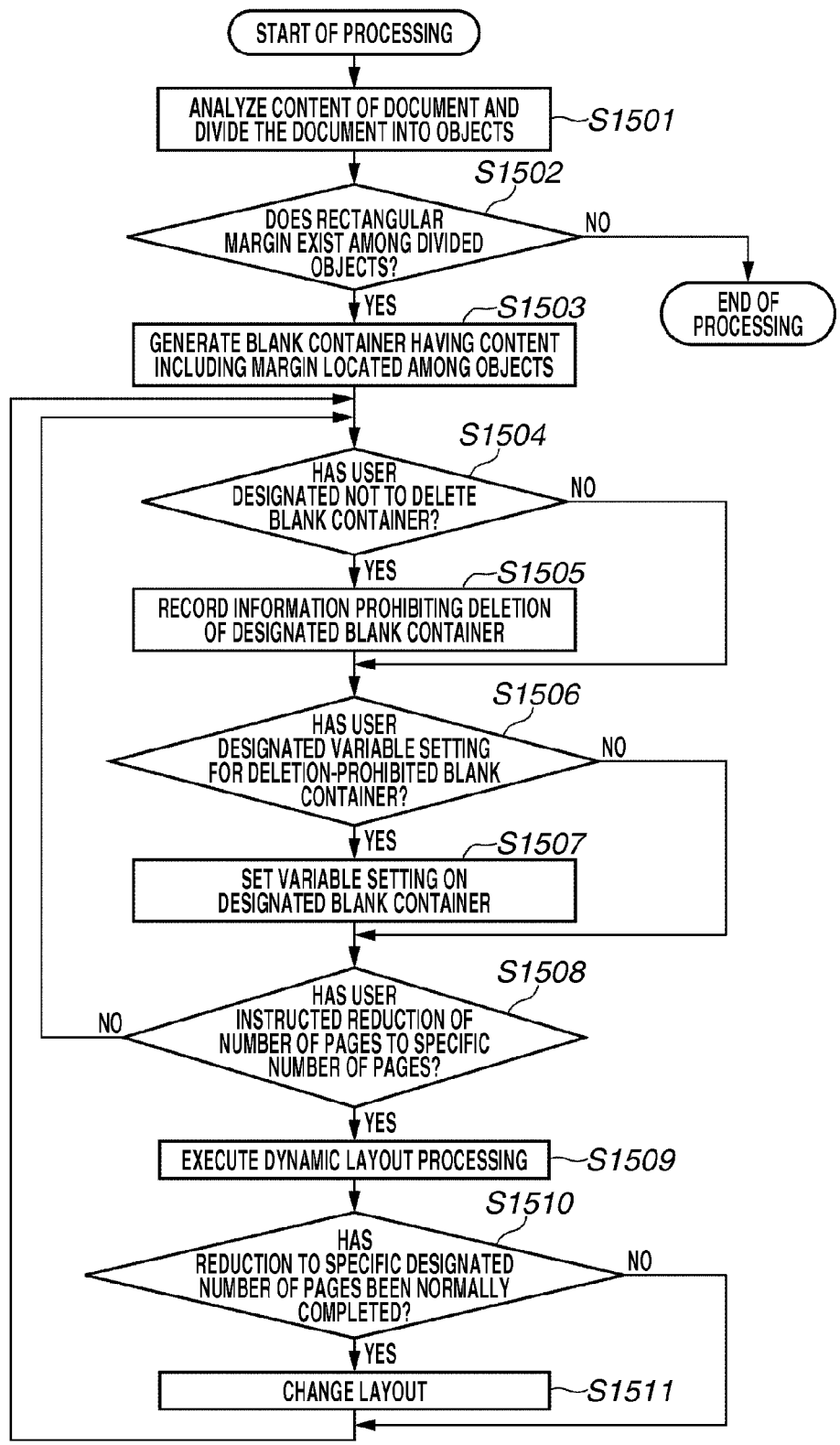
FIG. 15 is a flow chart illustrating exemplary processing executed according to the document editing program.
Figure 16:
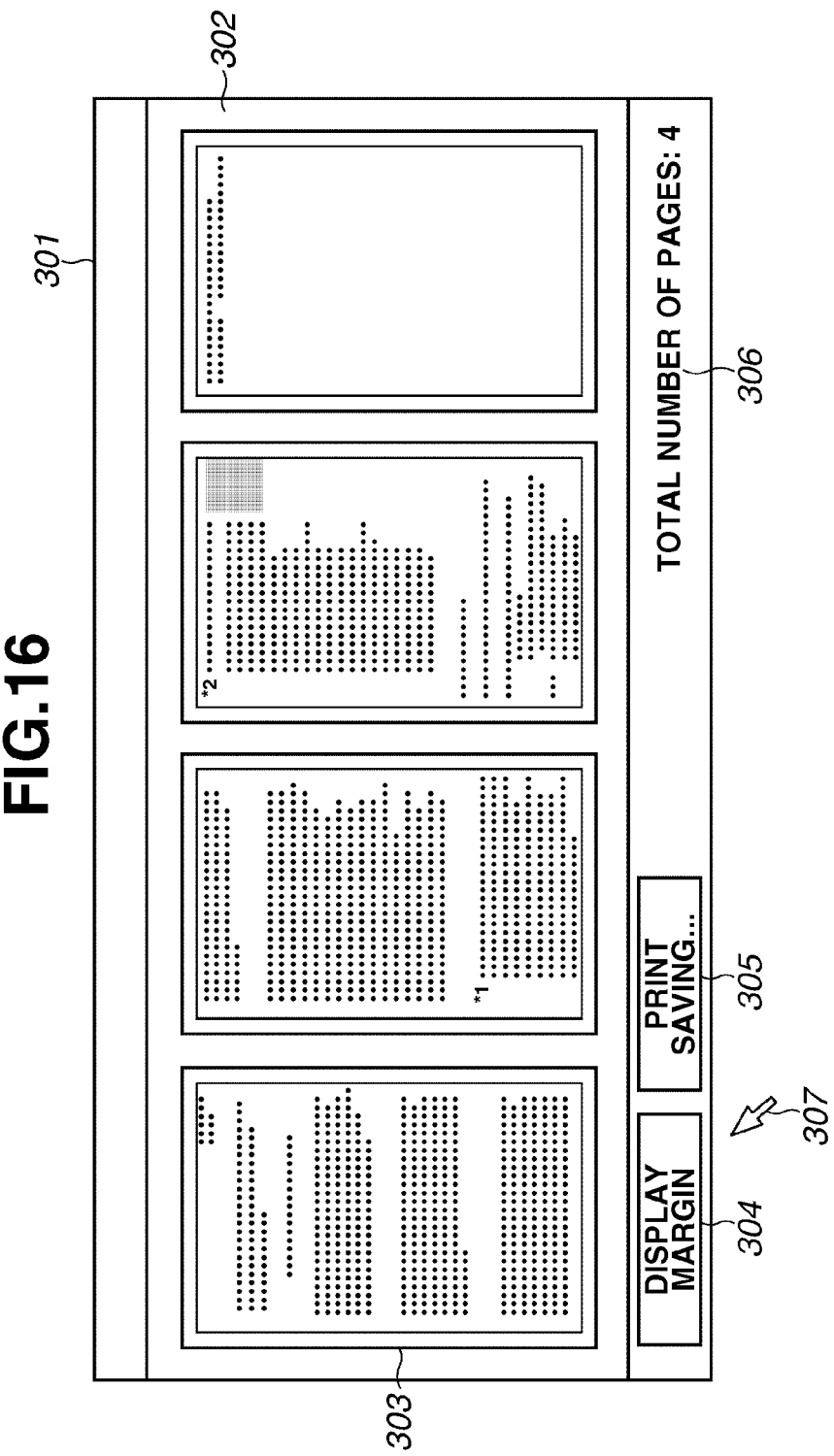
FIG. 16 illustrates an example of a user interface of the document editing program.

FIG. 15 is a flow chart illustrating another exemplary processing executed according to a document editing program of the present invention. FIG. 16 illustrates an example of a user interface according to a second exemplary embodiment of the present invention.

In the document editing program according to the present exemplary embodiment, the processing in steps S1501 through S1503 are the same as that of the document editing program described above in the first exemplary embodiment (see FIGS. 2, 4, and 5). In addition, the user interface is similar to that described above in the first exemplary embodiment with reference to FIG. 3. Therefore, the configuration of the present exemplary embodiment similar to that of the first exemplary embodiment will not be repeated here. In executing the processing according to the document editing program, the CPU 135 displays a document 303 on the user interface.

In step S1504, the CPU 135 receives the designation for not deleting the blank container. In step S1505, the CPU 135 records information indicating the prohibition of the deletion of the blank container that has been designated as a deletion-prohibited blank container.

Figure 17:
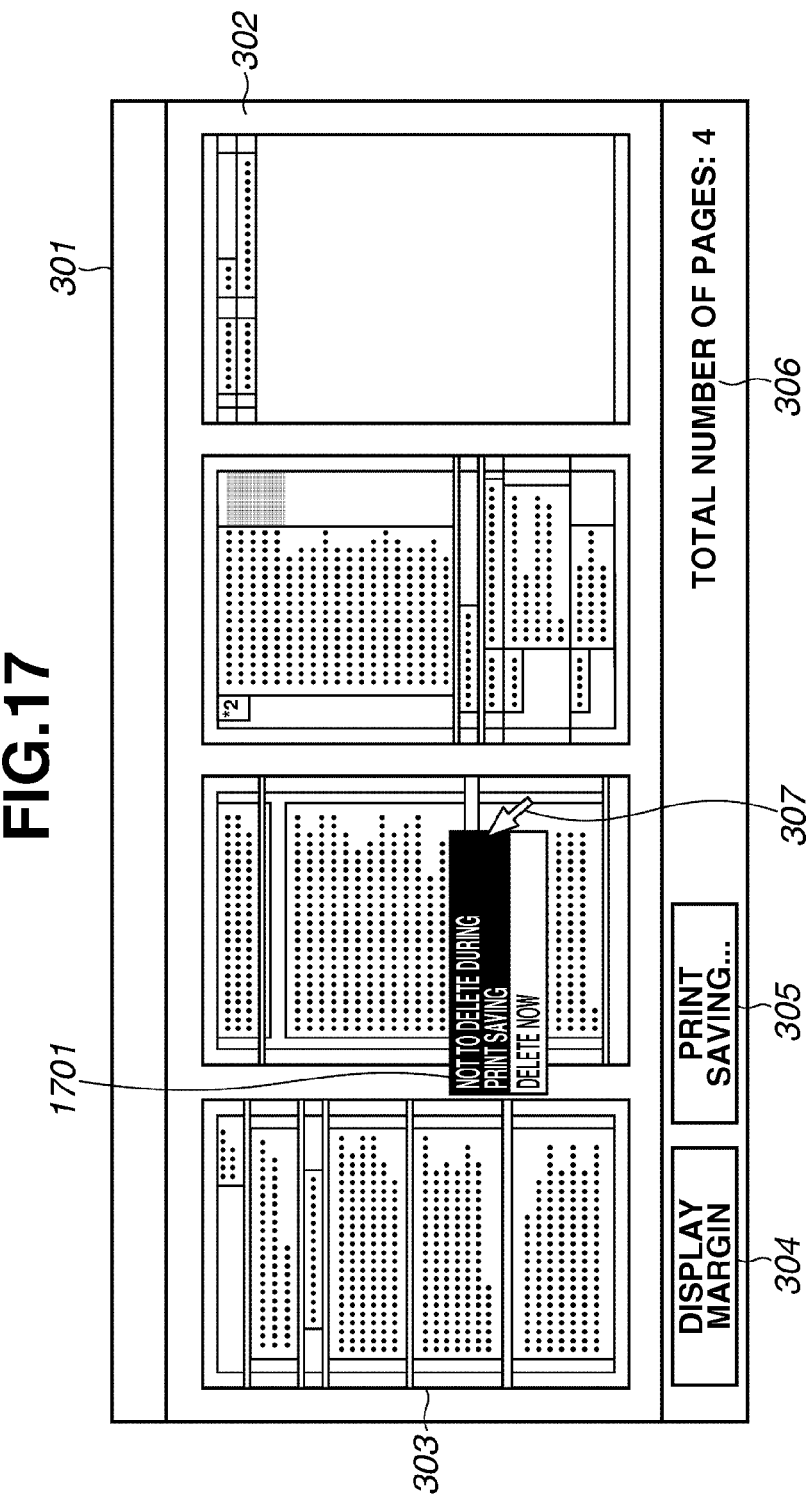
FIG. 17 illustrates an example of a user interface of the document editing program.

FIG. 17 illustrates an example of the user interface 301 displayed when the CPU 135 receives the user designation of the deletion-prohibited blank container in step S1504.

Referring to FIG. 17, when the CPU 135 receives the user operation executed by right-clicking of the mouse 133 on a blank container, the CPU 135 executes control for displaying a pop-up menu 1701. When the user inputs a designation "not to delete during print saving", the CPU 135 receives the deletion prohibition instruction. The CPU 135, according to the deletion prohibition instruction, records information prohibiting the deletion of the designated blank container whose prohibition of deletion has been designated during editing the document.

Figure 18:
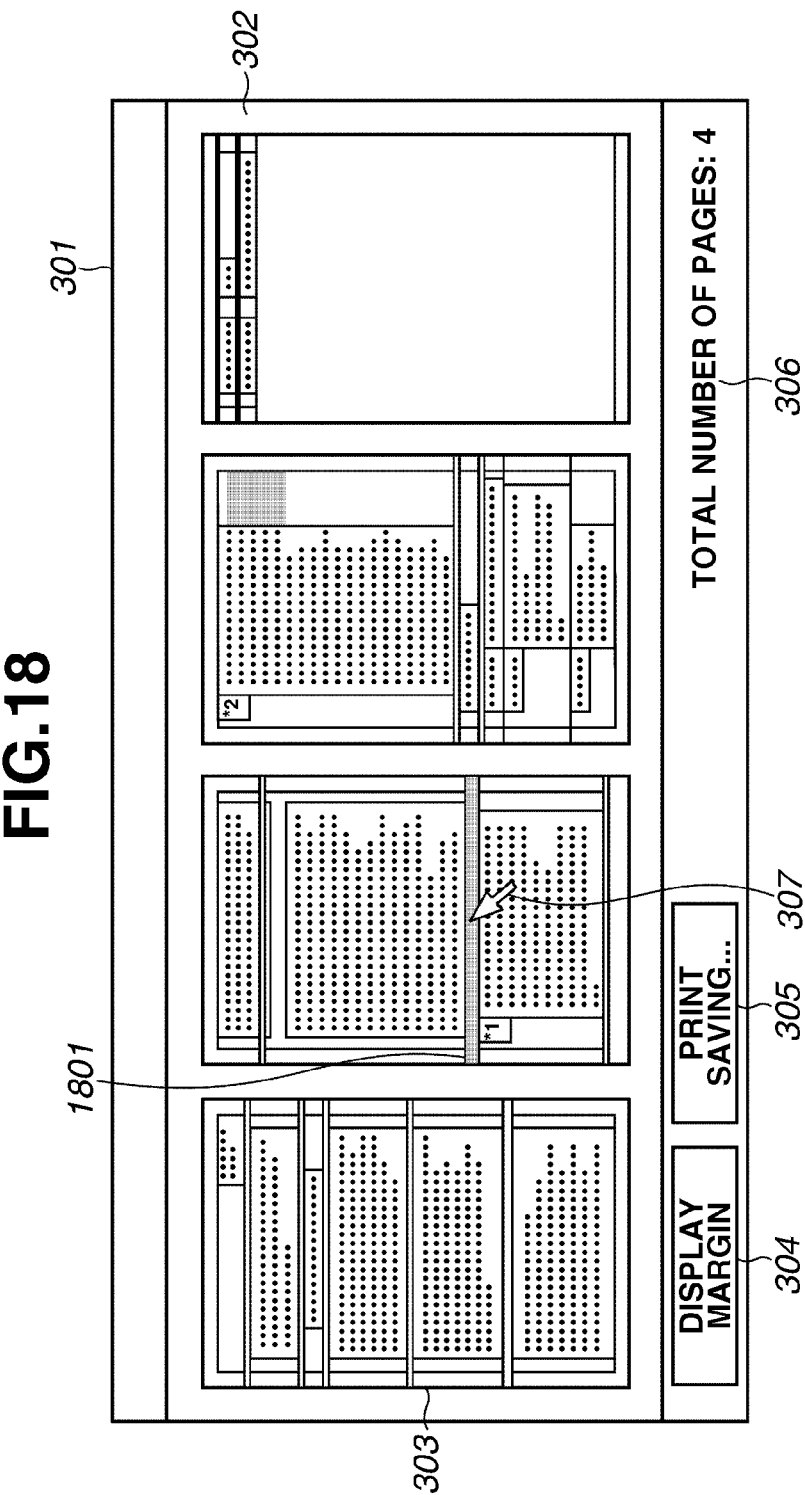
FIG. 18 illustrates an example of a user interface of the document editing program.

FIG. 18 illustrates an example of the user interface 301 displayed under control of the CPU 135 according to the present exemplary embodiment. More specifically, in the example illustrated in FIG. 18, the user interface 301 displays a screen on the video display 144 if the user has designated a blank container as a deletion-prohibited blank container when the CPU 135 records information prohibiting the deletion of the designated deletion-prohibited blank container on the HDD 140.

Referring to FIG. 18, the CPU 135 executes control for displaying the deletion-prohibited blank container in a solidly shaded state so that the user can easily confirm that the prohibition of deletion of a deletion-prohibited blank container 1801 has been surely designated.

If the user designates prohibition of deletion of another blank container, the CPU 135, according to the deletion prohibition designation, records information prohibiting the deletion of another blank container whose deletion has been prohibited.

In step S1506, the CPU 135 determines whether to execute variable setting on the deletion-prohibited blank container. If the user has designated the variable setting on the deletion-prohibited blank container (YES in step S1506), then the processing advances to step S1507. In step S1507, the CPU 135 changes the designated deletion-prohibited blank container into a reducible variable container.

Figure 19:
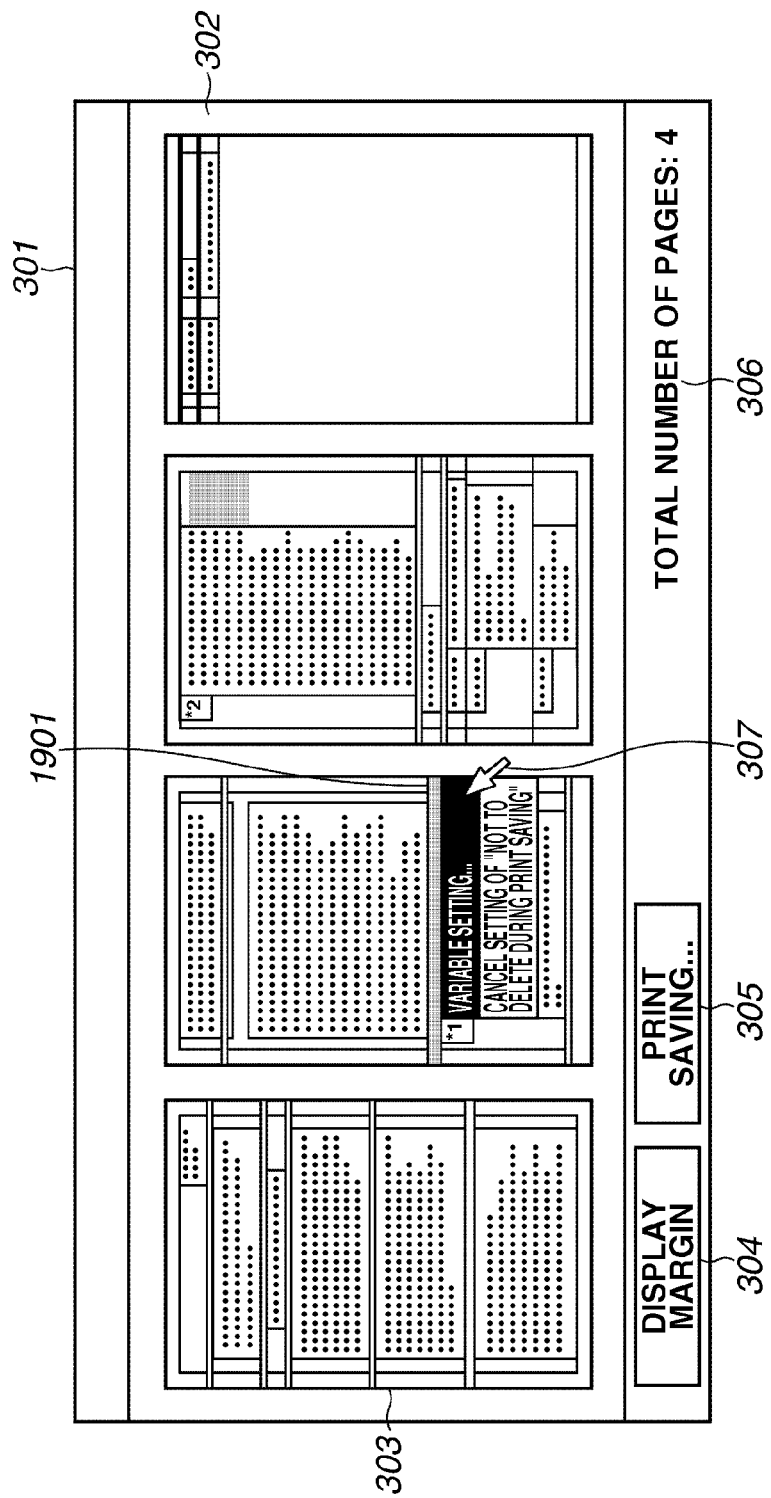
FIG. 19 illustrates an example of a user interface of the document editing program.

FIG. 19 illustrates an example of the user interface 301 displayed when the CPU 135 has received, in step S1506, a user instruction for variable setting on the designated deletion-prohibited blank container.

When the CPU 135 receives a user operation executed by right-clicking the mouse 133 over the blank container designated by using the mouse pointer 307, the CPU 135 displays a pop-up menu 1901. If the user designates "variable setting" on the pop-up menu 1901, a property dialog for the blank container, which is linked with the item "variable setting", is displayed.

Figure 20:
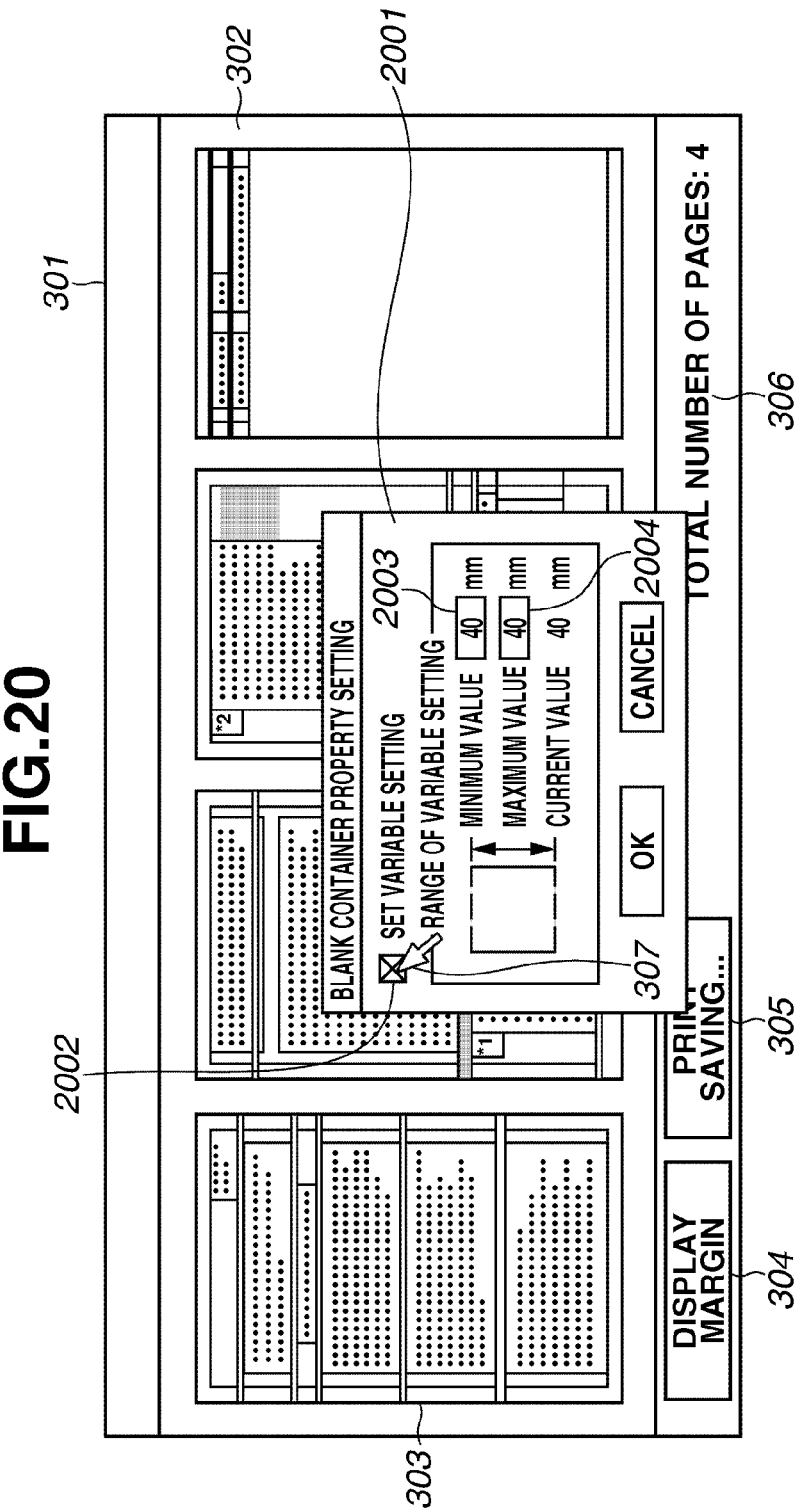
FIG. 20 illustrates an example of a user interface of the document editing program.

FIG. 20 is illustrates an example of a blank container property dialog 2001. Referring to FIG. 20, a variable setting designation check box 2002 can be operated to issue an instruction for set a variable setting of the container.

In the example illustrated in FIG. 20, the CPU 135 sets the variable setting according to whether the variable setting designation check box 2002 has been checked ("ON" (set variable setting)) or not ("OFF" (not to set variable setting)). If the variable setting designation check box 2002 is checked ("ON"), the CPU 135 enables entering of a text in an "edit minimum value" box 2003 and an "edit maximum value" box 2004. On the other hand, if the variable setting designation check box 2002 is not checked ("OFF"), the CPU 135 disables (prohibits) entering of a text in the "edit minimum value" box 2003 and the "edit maximum value" box 2004.

The "edit minimum value" box 2003 is a box for setting a minimum value of the height of a blank container used in dynamically changing the blank container. The "edit maximum value" box 2004 is a box for setting a maximum value of the height of a blank container used in dynamically changing the blank container.

Similarly, with respect to the other deletion-prohibited blank containers, if the variable setting thereon has been designated thereon, the CPU 135 receives the variable setting designation and changes the designated deletion-prohibited blank container into a variable container.

Figure 21:
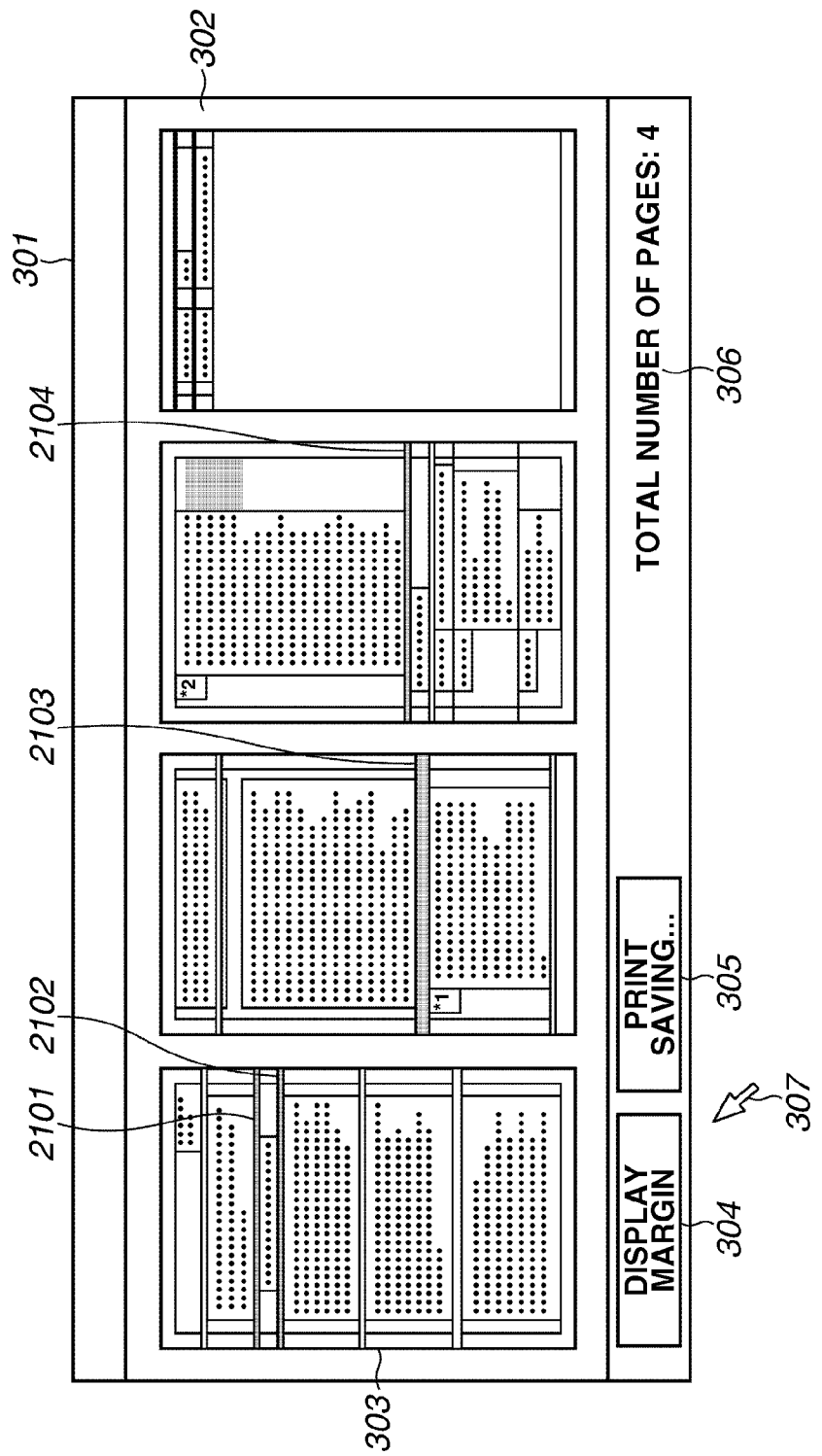
FIG. 21 illustrates an example of a user interface of the document editing program.

FIG. 21 illustrates an exemplary state, after designating variable setting, of each of blank containers 2101 through 2104 whose deletion has been prohibited by the user designation. Referring to FIG. 21, after the variable setting has been set, the CPU 135 displays the blank containers 2101 and 2102 in a solidly shaded state to indicate that the variable setting thereon has been completely set. Accordingly, the user can visibly confirm that the variable setting on the designated blank container has been completely set.

In step S1508 (FIG. 15), the CPU 135 receives a user instruction for reducing the total number of pages of the document to a specific designated number of pages. In step S1509, the CPU 135 executes the dynamic layout processing.

Figure 22:
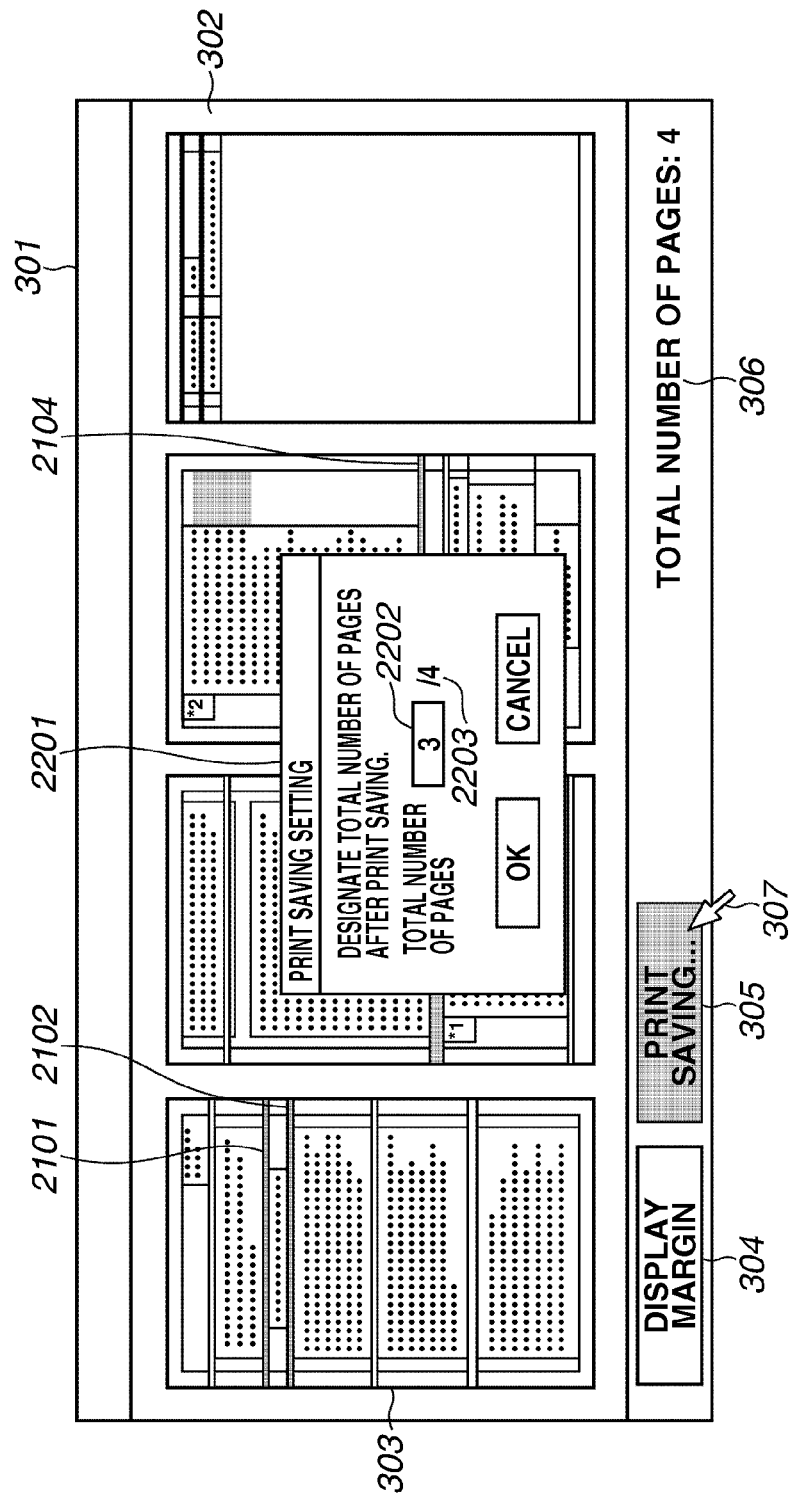
FIG. 22 illustrates an example of a user interface of the document editing program.

FIG. 22 illustrates an example of the user interface 301 displayed when receiving a user instruction for reducing the total number of pages to a specific number of pages designated by the user in step S1508 (FIG. 15).

Referring to FIG. 22, when the user has pressed the "print saving" button 305 by operating the mouse 133, the CPU 135 displays a print saving setting dialog 2201. The print saving setting dialog 2201 includes a number of pages-designation editing box 2202. In the layout changing processing, the user designates a specific number of pages of the document, which is the target of reducing the total number of pages of the document.

In addition, the print saving setting dialog 2201 includes a current number of pages-display text box 2203. The current number of pages-display text box 2203 is a box for displaying the current total number of pages of the document. If the user presses an "OK" button on the print saving setting dialog 2201, the user can finally set the setting entered in the number of pages-designation editing box 2202. On the other hand, if the user presses a "cancel" button on the print saving setting dialog 2201, the user can cancel the setting once entered in the number of pages-designation editing box 2202.

Figure 23:
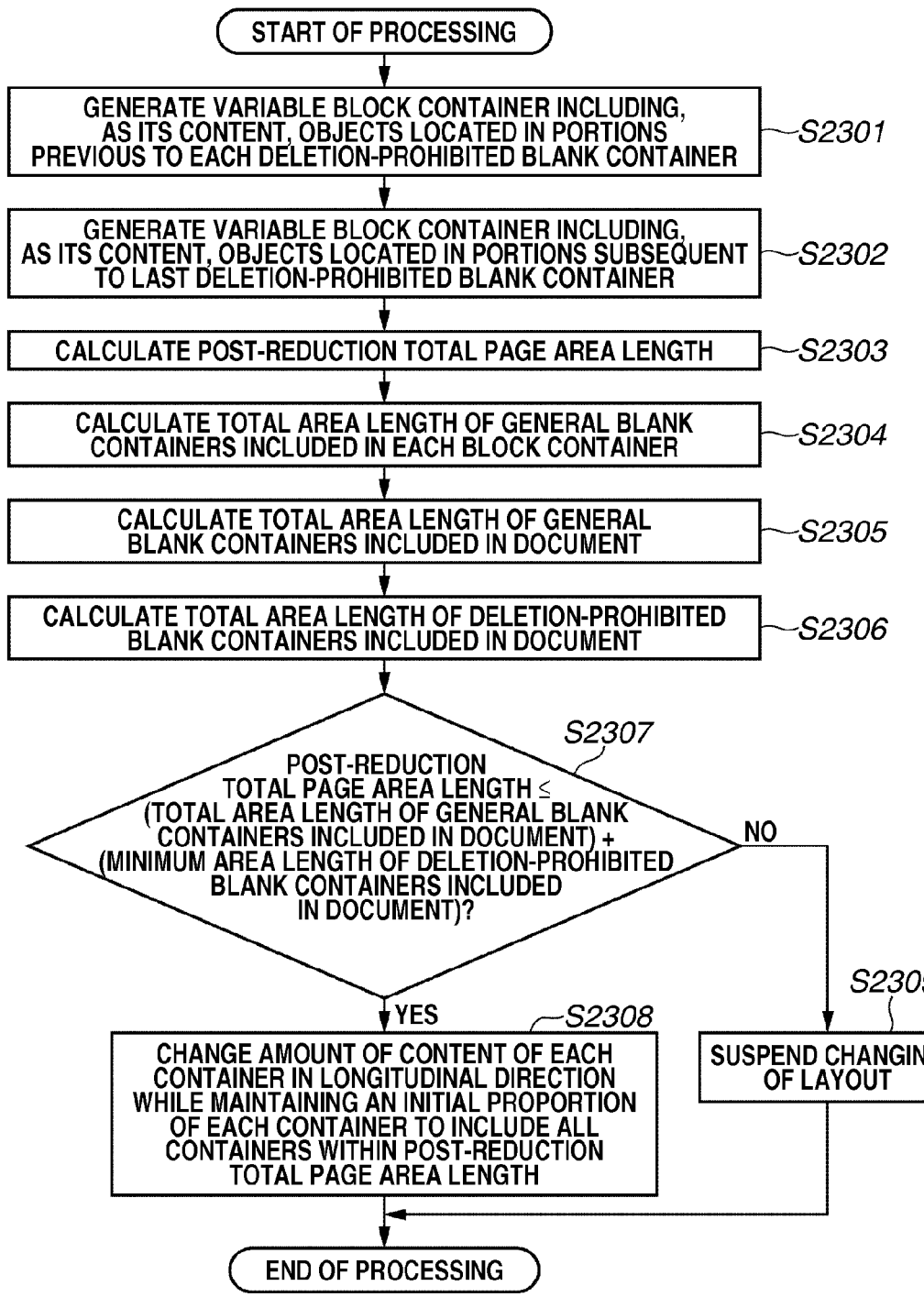
FIG. 23 is a flow chart illustrating exemplary processing executed according to the document editing program.

FIG. 23 is a flow chart illustrating an example of processing executing during the dynamic layout processing executed by the CPU 135 in step S1509 (FIG. 15). Hereinbelow, a blank container that has been recorded as a deletion-prohibited blank container in step S1505 (FIG. 15) will be simply referred to as a "deletion-prohibited blank container" while a blank container that has not been recorded as a deletion-prohibited blank container in step S1505 (FIG. 15) will be simply referred to as a "general blank container".

Referring to FIG. 23, in step S2301, the CPU 135 generates a variable block container including, as its content, a front text object, an image object, and a general blank container, which are located in a portion previous to each deletion-prohibited blank container, for each deletion-prohibited blank container included in the document.

In this case, the CPU 135 determines whether any other deletion-prohibited blank container exists in a portion previous to the above-described deletion-prohibited blank container. If it is determined that another deletion-prohibited blank container exists in a portion previous to the above-described deletion-prohibited blank container, then the CPU 135 generates a variable front block container including one block integrally including objects located in a portion previous to the another deletion-prohibited blank container.

In step S2302, the CPU 135 generates a variable rear block container including, as its content, a text object, an image object, and a general blank container, which are located in a portion subsequent to the deletion-prohibited blank container, for a last deletion-prohibited blank container included in the document.

Figure 24:
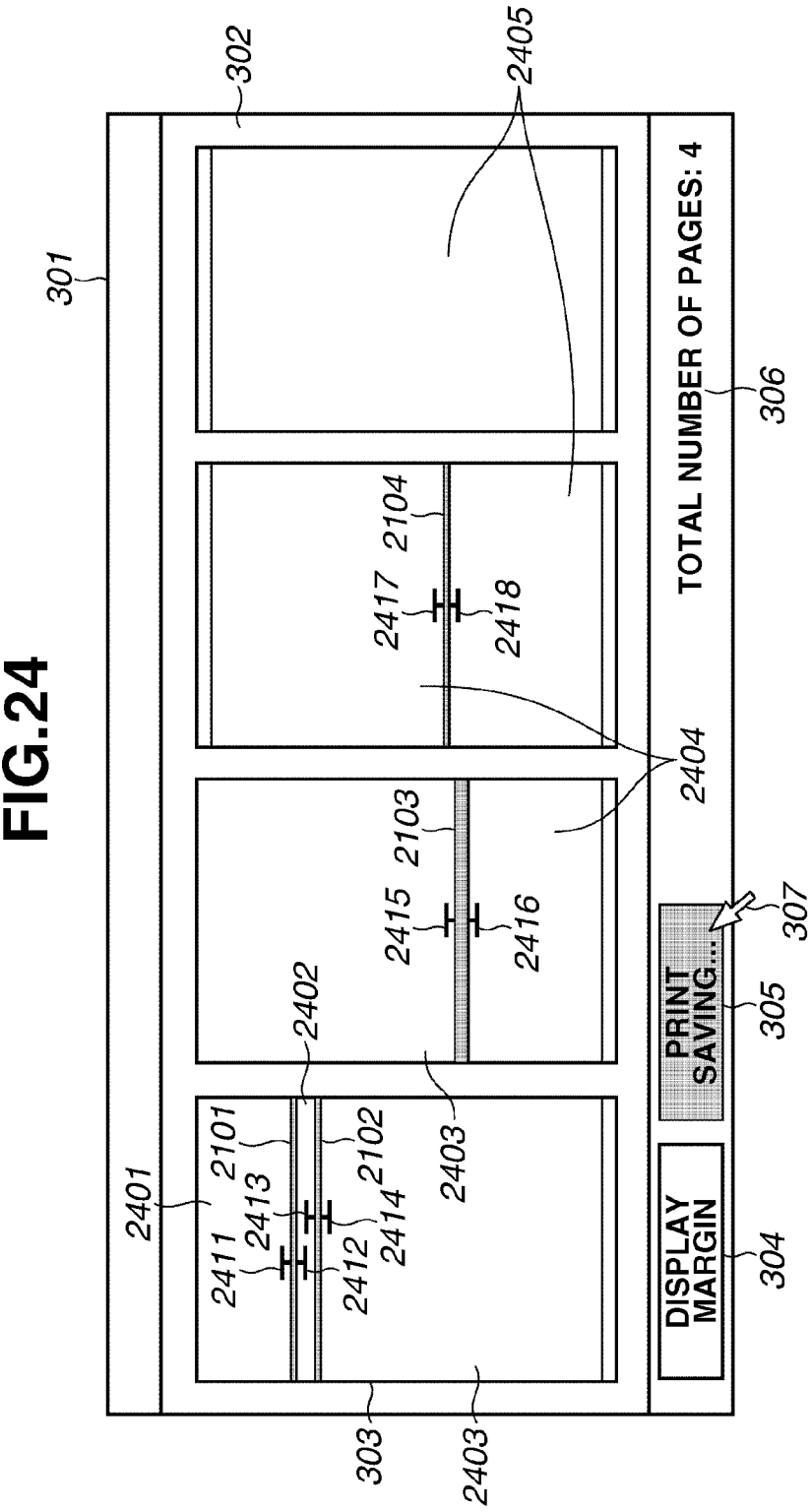
FIG. 24 illustrates an example of a user interface of the document editing program.

FIG. 24 illustrates an example of the user interface 301 displayed on the video display 144 when a block container is generated in steps S2301 and S2302 (FIG. 23). Referring to FIG. 24, the user interface 301 includes block containers 2401 through 2405 and links (combining portions) 2411 through 2418. The links 2411 through 2418 have the same configuration as those described above in the first exemplary embodiment. Accordingly, the description thereof will not be repeated here.

Figure 25:
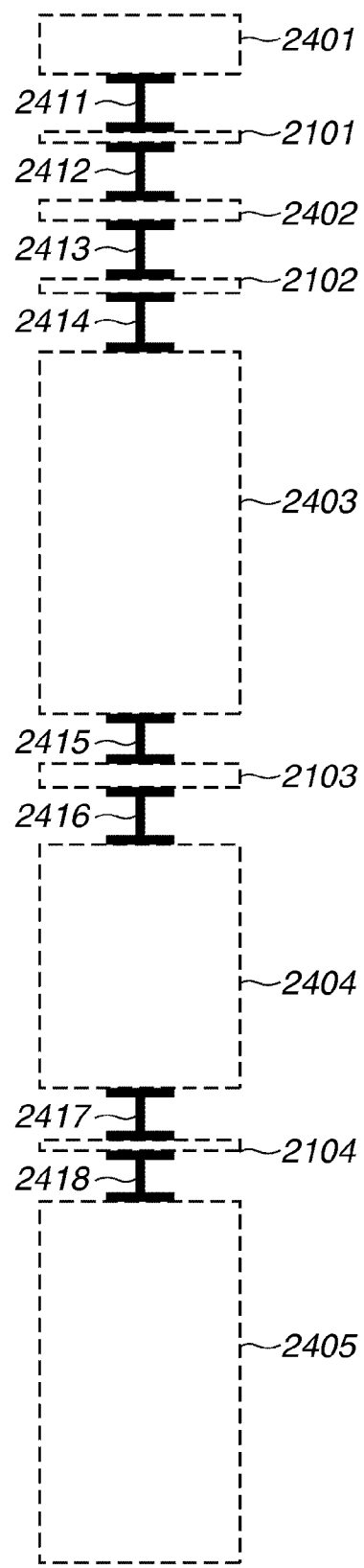
FIG. 25 schematically illustrates an example of an aggregate of containers illustrated in FIG. 24.

FIG. 25 schematically illustrates an example of the aggregate of containers illustrated in FIG. 24. The top side and the bottom side of the deletion-prohibited blank containers 2101 through 2104 and the block containers 2401 through 2405, which have been designated to the variable setting by the user, are variably set according to the above-described variable setting. The size of each of the deletion-prohibited blank containers 2101 through 2104 and the block containers 2401 through 2405 can be changed by dynamic layout calculation, which will be described in detail below.

In step S2303, the CPU 135 functions as a total page area length calculation unit. More specifically, the total page area length calculation unit calculates the total length of the page areas of the document having the reduced total number of pages of the document reduced by the designation in step S1508 (FIG. 15).

The total length of the page areas refers to the total length of the lengths of the areas that can include content except for the page margins of each page. The total page area length will hereafter be simply referred to as a "post-reduction total page area length".

In step S2304, the CPU 135 calculates the total area length of the general blank containers included in each block container. In step S2305, the CPU 135 adds the total areas of the blank containers included in each block container to calculate the total area length of the lengths of the general blank containers included in the document. In step S2306, the CPU 135 adds the minimum area length of all the deletion-prohibited blank containers to calculate the minimum area length of the deletion-prohibited blank containers included in the document.

The CPU 135 uses the current area length (the height) for fixed deletion-prohibited blank containers while using the value entered in the "edit minimum value" box 2003 via the blank container property dialog 2001 for the variable deletion-prohibited blank containers.

In step S2307, the CPU 135 determines whether each value calculated in steps S2303 through S2606 satisfies the following relationship:

> Post-reduction total page area length≤(total area length of the general blank containers included in the document)+(minimum area length of the deletion-prohibited blank containers included in the document).

If it is determined that any of the above-described values does not satisfy the above-described relationship (NO in step S2307), then the processing advances to step S2309. In step S2309, the CPU 135 cancels the changing of the layout. On the other hand, if it is determined that the above-described value satisfies the above-described relationship (YES in step S2307), then the processing advances to step S2308. In step S2308, in order to include all the containers within the post-reduction total page area length calculated in step S2303, the CPU 135 adjusts the amount of content in a longitudinal direction while maintaining an initial proportion of each container.

For the calculation of the layout executed by the CPU 135 in step S2308, the algorithm discussed in Japanese Patent Application Laid-Open No. 2005-122728 and Japanese Patent Application Laid-Open No. 2005-135397 is used.

By using the method for dynamically calculating the layout of the container linked by the link discussed in the above-described Japanese Patent Application Laid-Open No. 2005-122728 and Japanese Patent Application Laid-Open No. 2005-135397, an aggregate of containers illustrated in FIG. 9 is generated including the blank container whose reduction has been designated (FIG. 8) and the block containers existing across the reduction target blank container (FIG. 8). In this case, the top side and the bottom side of only the reduction target container 801 are variable and the CPU 135 changes only the size of the reduction target container 801 by executing the dynamic layout calculation.

Figure 26:
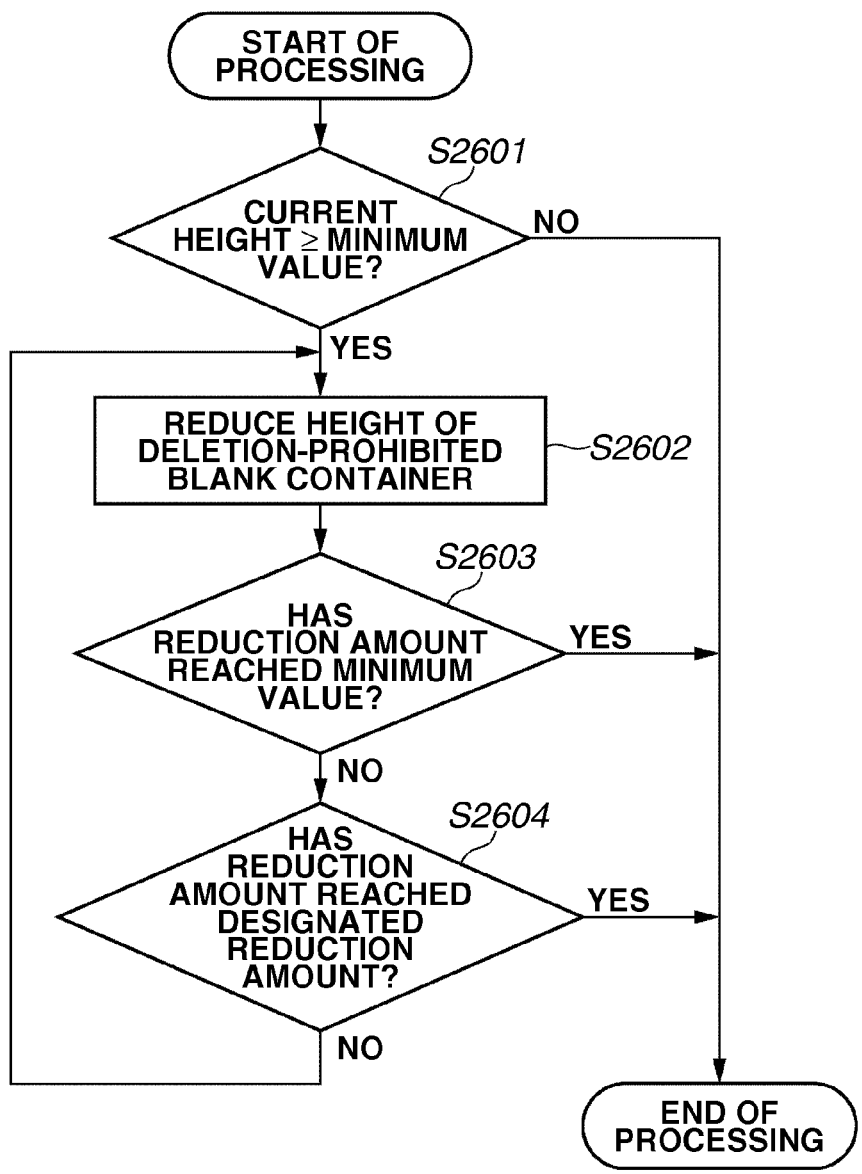
FIG. 26 is a flow chart illustrating exemplary processing executed according to the document editing program.
Figure 27:
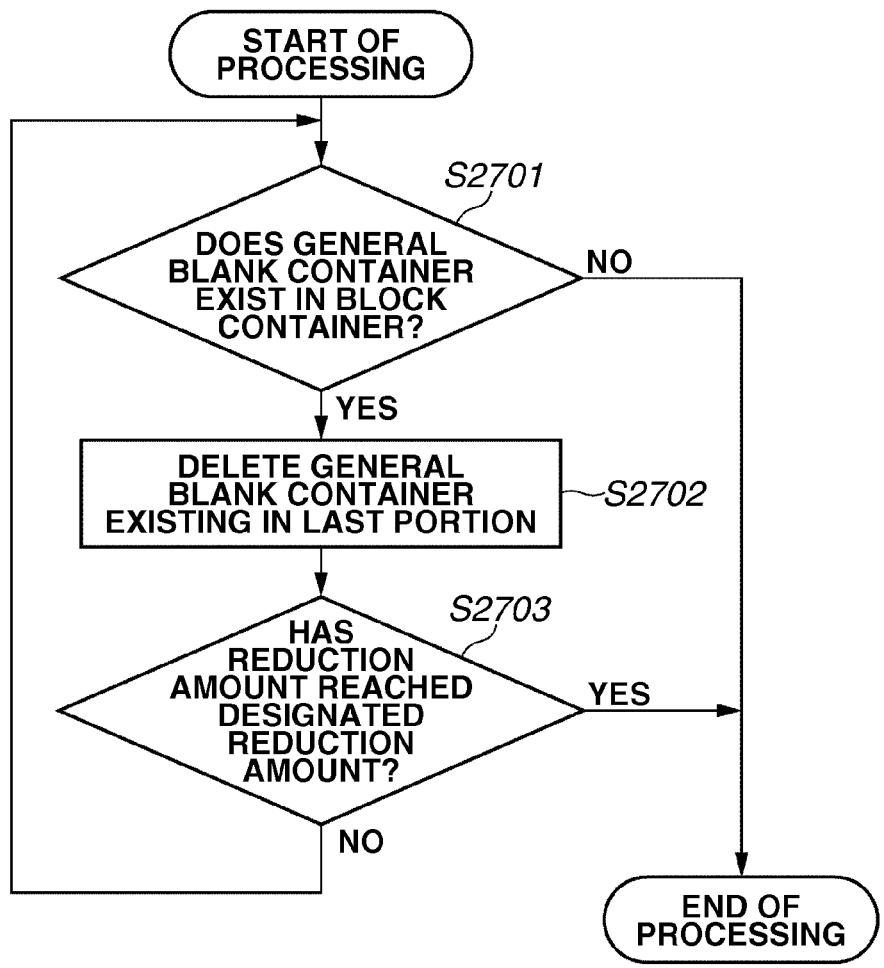
FIG. 27 is a flow chart illustrating exemplary processing executed according to the document editing program.

For the adjustment of the amount of content executed by the CPU 135 in step S2308, which is executed based on a result of the above-described calculation of layout, an algorithm illustrated in FIGS. 26 and 27 is used.

FIG. 26 is a flow chart illustrating an example of the algorithm for adjusting the amount of content of a deletion-prohibited blank container. FIG. 27 is a flow chart illustrating an example of the algorithm for adjusting the amount of content of a block container.

More specifically, FIG. 26 is a flow chart illustrating exemplary processing for reducing the amount of content of a deletion-prohibited blank container by a specific designated amount during the dynamic layout processing.

Referring to FIG. 26, in step S2601, the CPU 135 functions as a determination unit. More specifically, in reducing the amount of content of a deletion-prohibited blank container designated by the user by a specific designated amount, the CPU 135 determines whether the current height of the designated blank container is equal to or greater than the value designated by the user via the "edit minimum value" box 2003. If it is determined that the current height of the designated blank container is equal to or greater than the value designated by the user via the "edit minimum value" box 2003 (YES in step S2601), then the processing advances to step S2602. In step S2602, the CPU 135 reduces the height of the deletion-prohibited blank container.

In step S2603, the CPU 135 determines whether the blank container has been reduced according to the value designated via the "edit minimum value" box 2003. If it is determined that the blank container has been reduced according to the value designated via the "edit minimum value" box 2003 (YES in step S2603), then the processing ends. On the other hand, if it is determined that the blank container has not been reduced according to the value designated via the "edit minimum value" box 2003 (NO in step S2603), then the processing advances to step S2604. In step S2604, the CPU 135 executes calculation to determine whether the following condition is satisfied:

> Post-reduction total page area length≤(total area length of the general blank containers included in the document)+(minimum area length of the deletion-prohibited blank containers included in the document)

By executing the above-described calculation, the CPU 135 determines whether the amount of reduction executed on the document has reached the amount of reduction designated by the user. If it is determined that the amount of reduction executed on the document has reached the amount of reduction designated by the user (YES in step S2604), then the processing ends. On the other hand, if it is determined that the amount of reduction executed on the document has not reached the amount of reduction designated by the user (NO in step S2604), then the processing returns to step S2602. In step S2602, the CPU 135 repeats the processing for reducing the height of the deletion-prohibited blank container.

FIG. 27 is a flow chart illustrating exemplary processing for reducing the amount of content of a block container by a specific designated amount during dynamic layout processing.

Referring to FIG. 27, in step S2701, in reducing the amount of a block container by a specific designated amount, the CPU 135 determines whether a general blank container exists within the block container. If it is determined that no general blank container exists within the block container (NO in step S2701), then the processing ends. On the other hand, if it is determined that a general blank container exists within the block container (YES in step S2701), then the processing advances to step S2702.

In step S2702, the CPU 135 deletes a general blank container existing in a last portion of the block container. In step S2703, the CPU 135 executes calculation to determine whether the following condition is satisfied:

> Post-reduction total page area length≤(total area length of the general blank containers included in the document)+(minimum area length of the deletion-prohibited blank containers included in the document)

By executing the above-described calculation, the CPU 135 determines whether the amount of reduction executed on the document has reached the amount of reduction designated by the user.

If it is determined by the CPU 135 that the amount of reduction executed on the document has reached or exceeded the amount of reduction designated by the user (YES in step S2703), then the processing ends. On the other hand, if it is determined by the CPU 135 that the amount of reduction executed on the document has not reached the amount of reduction designated by the user (NO in step S2703), then the processing returns to step S2701 and repeats the processing in step S2701 and subsequent steps.

As described above, in the present exemplary embodiment, the CPU 135 serially deletes the blank containers starting from a last general blank container or serially deletes the general blank containers starting from a last general blank container included in the block container unless it is determined that no general blank container is included in the block container. In the above-described manner, the present exemplary embodiment reduces the total number of pages of the document to the reduction-target total number of pages designated by the user.

In reducing the amount of content of the block container by the specific amount designated by the user as illustrated in FIG. 27, it is also useful if the CPU 135 serially deletes the general blank containers starting from a top general blank container included in the block container.

In addition, in reducing the amount of content of the block container by the specific amount designated by the user as illustrated in FIG. 27, it is also useful if the CPU 135 determines the reduction amount separately and independently to each general blank container included in the block container according to the ratio of height of each general blank container. In this case, the CPU 135 reduces or deletes each general blank container included in the block container according to the reduction amount and the current height thereof.

After the adjustment of the amount of content of each container has been executed in step S2308, then the processing advances to step S1510 (FIG. 15). In this case, the CPU 135 determines that the total number of pages of the document has been normally reduced to the specific designated total number of pages and then the processing advances to step S1511. In step S1511, the CPU 135 executes the calculation to determine whether each value satisfies the following condition:

> Post-reduction total page area length≤(total area length of the general blank containers included in the document)+(minimum area length of the deletion-prohibited blank containers included in the document).

By executing the above-described calculation, the CPU 135 determines whether the amount of reduction executed on the document has reached the amount of reduction designated by the user in step S2703. If it is determined that the amount of reduction executed on the document has reached the amount of reduction designated by the user (YES in step S2703), then the processing ends (the CPU 135 finally sets the change of the layout). On the other hand, if it is determined that the amount of reduction executed on the document has reached the amount of reduction designated by the user (NO in step S2703), then the CPU 135 returns to step S2701 (FIG. 27) and repeats the processing in step S2701 and the subsequent steps.

Figure 28:
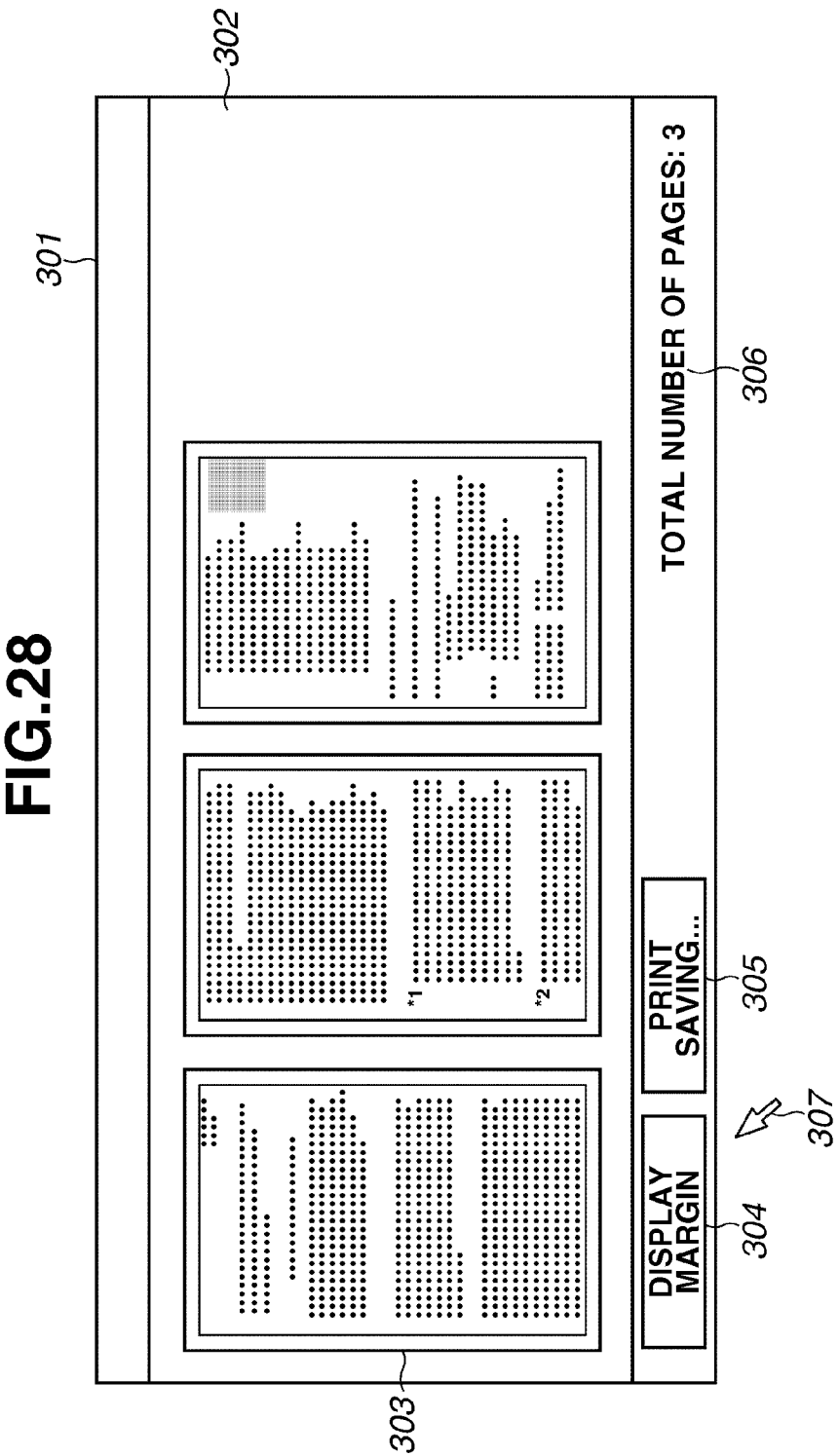
FIG. 28 illustrates an example of a user interface of the document editing program.

FIG. 28 illustrates an example of the user interface 301 displayed when the total number of pages of the document has been normally reduced, in which one page has been designated. If the reduction of the total number of pages to the reduction-target number of pages finally set by the change of the layout is normally completed, then the CPU 135 updates the display of the number of pages displayed in the total number of pages display area 306.

If the CPU 135 suspends the processing for changing the layout in step S2309 (FIG. 23), then the processing advances to step S1510 (FIG. 15). In step S1510, the CPU 135 determines that the reduction of the total number of pages of the document to the reduction-target number of pages has not been normally completed. In this case, the CPU 135 returns the user interface 301 to the screen illustrated in FIG. 21.

In reducing the amount of content of the block container illustrated in FIG. 27 by the specific amount designated by the user, it is also useful if the CPU 135 deletes the general blank containers starting from a top general blank container of the block container. In addition, if a last object included in the block container existing in a last page of the document is a blank container before adjusting the amount of content in the longitudinal direction, it is also useful if the CPU 135 deletes the blank container similar to the processing described above in the first exemplary embodiment.

In the present exemplary embodiment, if it is determined in step S2307 that any of the values calculated in steps S2303 through S2606 does not satisfy the above-described condition for the post-reduction total page area length, in step S2309, the CPU 135 suspends the processing for changing the layout. However, if a sum of the total area length of the general blank containers included in the document and the minimum area length of the deletion-prohibited blank containers satisfies a total area length equivalent to that of one page, it is useful if the CPU 135 continues the processing for changing the layout.

As described above, in the document editing apparatus according to the present exemplary embodiment, the CPU 135 automatically generates a blank container including the margins of the document as the content. In addition, if it is designated by the user that one or more blank containers is to be left in the document, then the CPU 135 generates a variable container (block container) including the objects located across the designated blank container (including the blank objects that has not been designated) as the content.

In addition, in executing the above-described dynamic layout processing to reduce the total number of pages of the document to the number of pages designated by the user, the CPU 135 of the document editing apparatus reduces the amount of content by deleting the blank objects included in the block container if necessary. With the above-described configuration, the present exemplary embodiment can leave a blank area (margin) as desired (designated) by the user in executing the layout to reduce the total number of pages of the document to the number of pages designated by the user while reducing the blank area (margin) of the document.

With the above-described configuration, the present invention can appropriately reduce the total number of pages. Accordingly, the present invention can increase the readability and improve the appearance of the document. In addition, the present invention having the above-described configuration can save the number of printing sheets necessary in printing the document.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2008-262237 filed Oct. 8, 2008, which is hereby incorporated by reference herein in its entirety.

What is claimed is:

1. A document editing apparatus comprising a processor and a memory, cooperating to function as:
   a first display unit configured to display a plurality of blank areas between objects included in a document;
   a prohibition unit configured to receive a user's designation of a deletion-prohibited blank area arbitrarily selected from among the plurality of blank areas displayed by the first display unit to prohibit deleting of the deletion-prohibted blank area;
   a first setting unit configured to set a target number of pages which is obtained by executing processing for reducing a number of sheets;
   a second setting unit configured to set a minimum value to the deletion-prohibited blank area;
   an editing unit configured to, in a case where the processing for reducing the number of sheets is started, delete a blank area for which deleting has not been prohibited and to reduce the deletion-prohibited blank area to the minimum value;
   a determination unit configured to determine whether a number of pages of an editing result by the editing unit reaches the target number of pages; and
   a second display unit configured to display the editing result by the editing unit when the number of pages of the editing result is determined to reach the target number of pages.

2. The document editing apparatus according to claim 1, wherein the first display unit displays the deletion-prohibited blank area and the blank area for which deleting is not prohibited in a distinguishable manner before editing processing is executed.

3. The document editing apparatus according to claim 1, further comprising a setting screen display unit configured to display a setting screen including both of an item for receiving a setting of the minimum value and a current value,
   wherein the second setting unit sets the minimum value according to an instruction input to the setting screen.

4. A method for editing a document comprising:
   a first display step of displaying a plurality of blank areas between objects included in a document;
   a prohibition step of receiving a user's designation of a deletion-prohibited blank area arbitrarily selected from among the plurality of blank areas displayed in the first display step to prohibit deleting of the deletion-prohibited blank area;
   a first setting step of setting a target number of pages which is obtained by executing processing for reducing a number of sheets;
   a second setting step of setting a minimum value to the deletion-prohibited blank area;
   an editing step of, in a case where the processing for reducing the number of sheets is started, deleting a blank area for which deleting is not prohibited and reducing the deletion-prohibited blank area to the minimum value;
   a determination step of determining whether a number of pages of an editing result in the editing step reaches the target number of pages; and
   a second display step of displaying the editing result when the number of pages of the editing result in the editing step is determined to reach the target number of pages.

5. The document editing method according to claim 4, wherein the first display step displays the deletion-prohibited blank area and the blank area for which deleting is not prohibited in a distinguishable manner before editing processing is executed.

6. The document editing method according to claim 4, further comprising:
   a setting screen display step of displaying a setting screen including both of an item for receiving a setting of the minimum value and a current value,
   wherein the second setting step sets the minimum value according to an instruction input to the setting screen.

7. A non-transitory computer-readable storage medium storing instructions which, when executed by a computer, cause the computer to perform a method, the method comprising:
   a first display step of displaying a plurality of blank areas between objects included in a document;
   a prohibition step of receiving a user's designation of a deletion-prohibited blank area arbitrarily selected from among the plurality of blank areas displayed in the first display step to prohibit deleting of the deletion-prohibited blank area;
   a first setting step of setting a target number of pages which is obtained by executing processing for reducing a number of sheets;
   a second setting step of setting a minimum value to the deletion-prohibited blank area;
   an editing step of, in a case where the processing for reducing the number of sheets is started, deleting a blank area for which deleting is not prohibited and reducing the deletion-prohibited blank area to the minimum value;
   a determination step of determining whether a number of pages of an editing result in the editing step reaches the target number of pages; and
   a second display step of displaying the editing result when the number of pages of the editing result in the editing step is determined to reach the target number of pages.

8. The storage medium according to claim 7, wherein the first display step displays the deletion-prohibited blank area and the blank area for which deleting is not prohibited in a distinguishable manner before editing processing is executed.

9. The storage medium according to claim 7, further comprising:
- a setting screen display step of displaying a setting screen including both of an item for receiving a setting of the minimum value and a current value,
- wherein the second setting step displaying sets the minimum value according to an instruction input to the setting screen.

* * * * *